United States Patent
van der Mee et al.

(10) Patent No.: US 8,969,447 B2
(45) Date of Patent: *Mar. 3, 2015

(54) THERMOPLASTIC POLYCARBONATE COPOLYMER COMPOSITIONS, METHODS OF THEIR MANUFACTURE, AND ARTICLES THEREOF

(71) Applicant: SABIC Innovative Plastics IP B.V., Bergen op Zoom (NL)

(72) Inventors: Mark Adrianus Johannes van der Mee, Breda (NL); Robert Dirk van de Grampel, Tholen (NL); Roland Sebastian Assink, Middelburg (NL); Paul Dean Sybert, Evansville, IN (US)

(73) Assignee: Sabic Global Technologies B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,355

(22) Filed: Feb. 28, 2013

(65) Prior Publication Data

US 2013/0224461 A1    Aug. 29, 2013

Related U.S. Application Data

(60) Provisional application No. 61/604,858, filed on Feb. 29, 2012.

(51) Int. Cl.
| | | |
|---|---|---|
| *C08K 5/523* | (2006.01) | |
| *C08K 5/5399* | (2006.01) | |
| *C08K 5/5397* | (2006.01) | |
| *B32B 5/00* | (2006.01) | |
| *C08L 69/00* | (2006.01) | |
| *C08K 3/04* | (2006.01) | |
| *C08K 5/5393* | (2006.01) | |
| *C08K 9/00* | (2006.01) | |
| *C08K 3/22* | (2006.01) | |

(52) U.S. Cl.
CPC .............. *C08K 5/523* (2013.01); *C08K 5/5399* (2013.01); *C08K 5/5397* (2013.01); *B32B 5/00* (2013.01); *C08L 69/00* (2013.01); *C08K 3/04* (2013.01); *C08K 5/5393* (2013.01); *C08K 9/00* (2013.01); *C08K 2003/2241* (2013.01)
USPC ........................................................ 524/127

(58) Field of Classification Search
USPC ................................................ 524/115–155
See application file for complete search history.

(56) References Cited

U.S. PATENT DOCUMENTS

| | | | |
|---|---|---|---|
| 4,430,484 | A | 2/1984 | Quinn |
| 7,767,738 | B2 | 8/2010 | Gaggar et al. |
| 7,790,292 | B2 | 9/2010 | Colborn et al. |
| 2005/0159577 | A1 | 7/2005 | Davis et al. |
| 2006/0142527 | A1 | 6/2006 | Glasgow et al. |
| 2007/0049706 | A1 | 3/2007 | Siripurapu et al. |
| 2007/0066737 | A1 | 3/2007 | Gallucci et al. |
| 2007/0129492 | A1 | 6/2007 | Colborn et al. |
| 2008/0004404 | A1* | 1/2008 | van de Grampel et al. ... 525/439 |
| 2008/0119631 | A1 | 5/2008 | Mullen |
| 2009/0306258 | A1 | 12/2009 | Siripurapu et al. |
| 2011/0229704 | A1 | 9/2011 | Grcev et al. |

FOREIGN PATENT DOCUMENTS

| | | |
|---|---|---|
| DE | 3844183 A1 | 6/1990 |
| EP | 0645422 A1 | 3/1995 |
| JP | 09183893 | 7/1997 |
| JP | 10007897 | 1/1998 |
| WO | 9410245 A1 | 5/1994 |
| WO | 2013130809 A1 | 9/2013 |

OTHER PUBLICATIONS

U.S. Appl. No. 13/724,780, filed Dec. 12, 2012.
U.S. Appl. No. 13/780,430, filed Feb. 28, 2013.
U.S. Appl. No. 13/874,700, filed May 1, 2013.
U.S. Appl. No. 13/874,746, filed May 1, 2013.
U.S. Appl. No. 13/874,896, filed May 1, 2013.
U.S. Appl. No. 13/915,710, filed Jun. 12, 2013.
Heat Release, Currenta GmbH & Co. OHG information sheet: "prCEN/TS 45545-2 (Feb. 2008)—Fire protection on railway vehicles: Heat Release", Feb. 2008, 3 pages.
Lateral Flame Spread, Currenta GmbH & Co. OHG information sheet: "CEN TS 45545-2 (Feb. 2008)—Fire protection on railway vehicles: Lateral Flame Spread", Feb. 2008, 2 pages.
Lin et al., "Polymers with Improved Flammability chracteristics. I.Phenolphthalein-Related Homopolymers", Journal of Polymer Science: Polymer Chemistry Edition, Vo. 19, pp. 2659-2670, 1981, XP009050158.
International Search Report for International Application No. PCT/US2013/028320, International Application Filing Date Feb. 28, 2013; Date of Mailing: Jun. 6, 2013; 5 pages.
Written Opinion for International Applicaton No. PCT/US2013/028320; International Application Filing Date: Feb. 28, 2013; Date of Mailing: Jun. 6, 2013; 5 pages.

(Continued)

*Primary Examiner* — Peter Szekely
(74) *Attorney, Agent, or Firm* — Cantor Colburn LLP

(57) ABSTRACT

A thermoplastic composition includes a poly(carbonate-arylate ester); and an organophosphorus compound in an amount effective to provide 0.1 to 1.0 wt % phosphorus based on the total weight of the composition, wherein an article molded from the composition has a smoke density after four minutes (Ds-4) of less than or equal to 300 determined according to ISO 5659-2 on a 3 mm thick plaque and a maximum average rate of heat release emission (MAHRE) of less than or equal to 90 kW/m² determined according to ISO 5660-1 on a 3 mm thick plaque.

41 Claims, 1 Drawing Sheet

(56) References Cited

OTHER PUBLICATIONS

Smoke Optical Density and Toxicity, Currenta GmbH & Co. OHG information sheet: "prCEN/TS 45545-2 (Feb. 2008)—Fire protection on railway vehicles: Smoke optical desnity and toxicity", Feb. 2008, 4 pages.

Schartel, B. "Phosphorus-based Flame Retardency Mechanisms— Old Hat or a Starting Point for Future Development?", Materials, 2010, vol. 3, pp. 4710-4745.

* cited by examiner

THERMOPLASTIC POLYCARBONATE COPOLYMER COMPOSITIONS, METHODS OF THEIR MANUFACTURE, AND ARTICLES THEREOF

CROSS-REFERENCE TO RELATED APPLICATIONS

This application claims the benefit of U.S. Patent Application No. 61/604,858, filed Feb. 29, 2012, which is incorporated by reference in its entirety herein.

BACKGROUND

This disclosure is directed to thermoplastic polycarbonate copolymer compositions, their method of manufacture, and articles thereof, and in particular to poly(carbonate-arylate ester) compositions having low smoke density and low heat release.

Polycarbonates are useful in a wide variety of applications at least in part because of their good balance of properties, such as moldability, heat resistance and impact properties among others. However, standards for flame retardancy properties such as flame spread, heat release, and smoke generation upon burning have become increasingly stringent, particularly in applications used in mass transportation (aircraft, trains, and ships), as well as building and construction. For example, the European Union has approved the introduction of a new harmonized fire standard for rail applications, namely EN-45545, to replace all currently active different standards in each member state. This standard will impose stringent requirements on heat release and smoke density properties allowed for materials used in these applications. Smoke density (Ds-4) in EN-45545 is the smoke density after four minutes determined in accordance with ISO 5659-2, and heat release in EN-45545 is the maximum average rate of heat emission (MAHRE) determined in accordance with ISO5660-1.

It is exceptionally challenging to develop materials that meet stringent smoke density standards and heat release standards in addition to other material requirements. It is particularly challenging to develop materials that meet these standards and that have good mechanical properties (especially impact/scratch resistance) and processability. Accordingly there remains a need for thermoplastic compositions that have a combination of low smoke and low heat release properties. It would be a further advantage if the compositions could be rendered low smoke and low heat release without a significant detrimental effect on one or more of material cost, processability, and mechanical properties. It would be a still further advantage if the materials could be readily thermoformed or injection molded. It would be a still further advantage if such materials were in compliance with European Railway standard EN-45545, for example, without having a detrimental effect on material cost, processability, and mechanical properties.

SUMMARY

Disclosed herein is a thermoplastic composition comprising a poly(carbonate-arylate ester); and an organophosphorus compound in an amount effective to provide 0.1 to 1.0 wt % of phosphorus based on the total weight of the composition, wherein an article molded from the composition has a smoke density after four minutes (Ds-4) of less than or equal to 300 determined according to ISO 5659-2 on a 3 mm thick plaque, and a maximum average rate of heat release emission (MAHRE) of less than or equal to 90 kW/m$^2$ determined according to ISO 5660-1 on a 3 mm thick plaque.

A method of manufacture of the thermoplastic compositions comprises extruding or melt-blending the components of the thermoplastic compositions to form the thermoplastic compositions.

In yet another embodiment, an article comprises the thermoplastic compositions, including a molded article, a thermoformed article, an extruded film, an extruded sheet, a foamed article, a layer of a multi-layer article, a substrate for a coated article, or a substrate for a metallized article. The article can be a transportation component, for example a component of a train, a floor for a train compartment, a train compartment, cladding, or seating for a train.

A method of manufacture of an article comprises molding, extruding, foaming, or casting the above-described thermoplastic composition to form the article.

The above described and other features are exemplified by the following detailed description and figures.

BRIEF DESCRIPTION OF THE DRAWINGS

A description of the figures, which are meant to be exemplary and not limiting, is provided in which.

DETAILED DESCRIPTION

Figure 1:
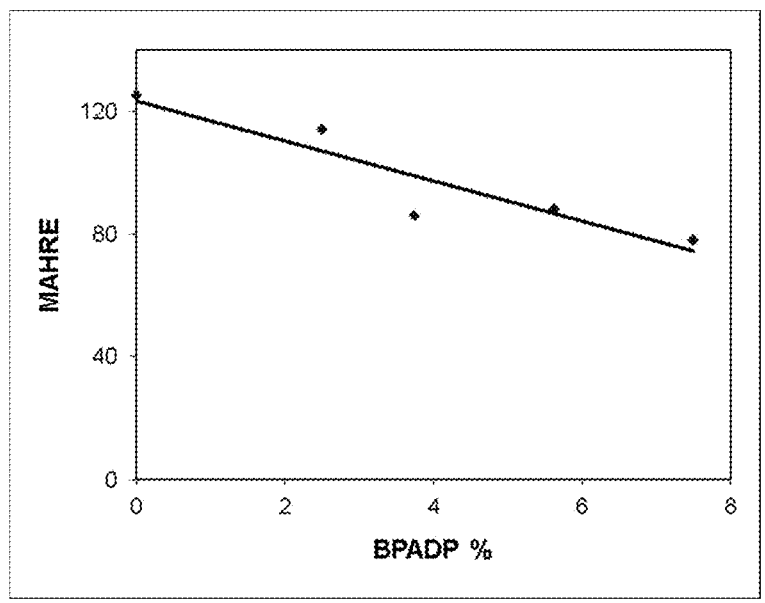
FIG. 1 shows the effect of increasing BPADP concentration in an ITR-PC copolymer on heat release (MAHRE)

The inventors hereof have discovered that thermoplastic compositions having low heat release characteristics, in particular improved MAHRE determined according to ISO5660-1 can unexpectedly be obtained by the addition of relatively small amounts of organophosphorus compounds to certain polycarbonate copolymers, in particular poly(carbonate-arylate ester)s. Addition of the organophosphorus compounds further does not adversely impact the smoke densities as determined according to ISO5659-2, and in some instances further reduces the smoke densities of the poly(carbonate-arylate ester)s. These results are particularly surprising because similar results are not observed when heat release is determined using other methods, for example, heat release testing performed using the Ohio State University (OSU) rate-of-heat release apparatus, in accordance with the method shown in FAR 25.853(d), and in Appendix F, section IV (FAR F25.4), or when smoke density is determined according to ASTM E662). Further, the other desirable properties of the poly(carbonate-arylate ester)s, for example low flow, impact properties, and colorability are not adversely affected.

Thus, poly(carbonate-arylate ester)s that do not meet low heat release standards can be formulated so as to have very low heat-release properties and low smoke densities, with improved processing properties such as flowability, and without significantly compromising mechanical properties such as impact resistance. The addition of the organophosphorus compounds to poly(carbonate-arylate ester) copolymers results in an improved balance of properties compared to the same copolymers without the organophosphorus compounds, namely significantly reduced heat release (MAHRE) determined according to ISO 5660-1, an equal or reduced smoke density (Ds-4) determined according to ISO 5659-2, and improved flow (MVR) determined according to ISO 1133, without significantly compromising practical impact properties (MAI) determined according to ISO 6603. In a particularly advantageous feature, the thermoplastic compositions can have very low smoke density with Ds-4 values at or below 150 determined according to ISO 5659-2 on a 3 mm thick plaque, a low maximum average heat release (MAHRE) at or below 60 kJ/m² determined according to ISO 5660-1 on a 3 mm thick plaque, while allowing sufficient melt flow for injection molding of relatively large parts, while simultaneously retaining sufficient practical impact resistance characteristics.

Accordingly, provided herein is a thermoplastic composition comprising a poly(carbonate-arylate ester), that is a copolymer comprising repeating carbonate units and repeating arylate ester units. As described in more detail below, the copolymers can additionally contain siloxane units. The repeating structural carbonate units of are of formula (1)

(1)

in which at least 75%, at least 90%, at least 95%, of the total number of $R^1$ groups contain aromatic moieties and the balance thereof are aliphatic, alicyclic, or aromatic groups. In an embodiment each $R^1$ is an aromatic group, for example a $C_{6-30}$ aromatic group that contains at least one aromatic moiety, to provide optimal flammability performance of the poly(carbonate-arylate ester)s. $R^1$ can be derived from a dihydroxy compound of the formula $HO$—$R^1$—$OH$, in particular a group of formula (2)

$$HO-A^1-Y^1-A^2-OH \qquad (2)$$

wherein each of $A^1$ and $A^2$ is a monocyclic divalent aromatic group and $Y^1$ is a single bond or a bridging group having one or more atoms that separate $A^1$ from $A^2$. For example, one atom separates $A^1$ from $A^2$. Specifically, each $R^1$ can be derived from an aromatic dihydroxy compound, in particular a bisphenol of formula (3)

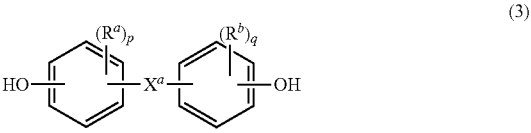
(3)

wherein $R^a$ and $R^b$ are each independently a $C_{1-12}$ alkyl; and p and q are each independently integers of 0 to 4. It will be understood that $R^a$ is hydrogen when p is 0, and likewise $R^b$ is hydrogen when q is 0. In an embodiment, no halogen is present.

Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)₂—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorus. The $C_{1-18}$ organic group can be disposed such that the $C_6$ arylene groups connected thereto are each connected to a common alkylidene carbon or to different carbons of the $C_{1-18}$ organic bridging group. p and q can each be 1, and $R^a$ and $R^b$ can each be a $C_{1-3}$ alkyl group, specifically methyl, disposed meta to the hydroxy group on each arylene group.

$X^a$ can be a substituted or unsubstituted $C_{3-18}$ cycloalkylidene, a $C_{1-25}$ alkylidene of formula —$C(R^c)(R^d)$— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —$C(=R^e)$— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

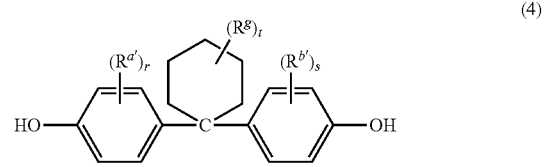
(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. Specifically, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. $R^{a'}$ and $R^{b'}$ can each independently be $C_{1-4}$ alkyl, $R^g$ is $C_{1-4}$ alkyl, r and s are each 1, and t is 0 to 5. Likewise, $R^{a'}$, $R^{b'}$ and $R^g$ can each be methyl, where r and s can each be 1, and t is 0 or 3. The cyclohexylidene-bridged bisphenol can be the reaction product of two moles of o-cresol with one mole of cyclohexanone. In another example, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

$X^a$ can also be a $C_{1-18}$ alkylene group, a $C_{3-18}$ cycloalkylene group, a fused $C_{6-18}$ cycloalkylene group, or a group of the formula —$B^1$-Q-$B^2$— wherein $B^1$ and $B^2$ are the same or different $C_{1-6}$ alkylene group and Q is a $C_{3-12}$ cycloalkylidene group or a $C_{6-16}$ arylene group.

$X^a$ can also be a substituted $C_{3-18}$ cycloalkylidene of formula (5)

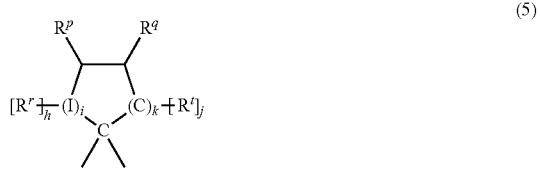
(5)

wherein $R^r$, $R^p$, $R^q$, and $R^t$ are each independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. The two adjacent groups (e.g., $R^q$ and $R^t$ taken together) can form an aromatic group, and likewise, $R^q$ and $R^t$ taken together can form one aromatic group and $R^r$ and $R^p$ taken together can form a second aromatic group. When $R^q$ and $R^t$ taken together form an aromatic group, $R^p$ can be a double-bonded oxygen atom, i.e., a ketone.

Other useful aromatic dihydroxy compounds of the formula HO—$R^1$—OH include monoaryl dihydroxy compounds of formula (6)

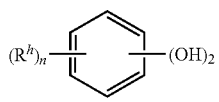

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine. In an embodiment, no halogen is present.

Some illustrative examples of specific aromatic dihydroxy compounds include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-2-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used.

In a specific embodiment, the polycarbonate units are of the formula (1a)

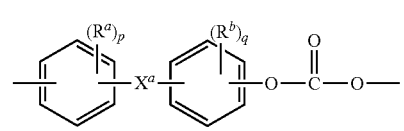

(1a)

wherein $R^a$ and $R^b$ are each independently are each independently $C_{1-12}$ alkyl, p and q are each independently integers of 0 to 4, and $X^a$ is a single bond, —O—, —S—, —S(O)—, —S(O)$_2$—, —C(O)—, or a $C_{1-18}$ organic group. Alternatively, $R^a$ and $R^b$ are each independently a $C_{1-3}$ alkyl, p and q are each independently 0 or 1, and $X^a$ is alkylidene of formula —C($R^c$)($R^d$)— wherein $R^c$ and $R^d$ are each $C_{1-6}$ alkyl. Specifically, the carbonate units are derived from bisphenol-A, in which each of $A^1$ and $A^2$ is p-phenylene and $Y^1$ is isopropylidene in formula (1a). Such units are referred to herein as "bisphenol A carbonate units."

In addition to carbonate units (1), specifically carbonate units (1a), more specifically bisphenol-A carbonate units, the poly(carbonate-arylate ester) copolymers contain repeating arylate ester units of formula (7)

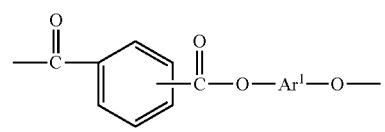

(7)

wherein $Ar^1$ is a $C_{6-32}$ hydrocarbyl group containing at least one aromatic group, e.g., a phenyl, naphthalene, anthracene, or the like. In an embodiment, $Ar^1$ is derived from a bisphenol (3), a monoaryl dihydroxy compound (6), or a combination comprising different bisphenol or monoaryl dihydroxy compounds. Thus, arylate ester units (7) can be derived by reaction of isophthalic acid, terephthalic acid, or a combination thereof (referred to herein as a "phthalic acid"), with an aromatic bisphenol (3), a monoaryl dihydroxy compound (6), or a combination thereof. The molar ratio of isophthalate to terephthalate can be 1:99 to 99:1, or 80:20 to 20:80, or 60:40 to 40:60.

The poly(carbonate-arylate ester) copolymers comprising carbonate units (1), specifically bisphenol-A carbonate units, and arylate ester units (7) can be alternating or block copolymers of formula (8)

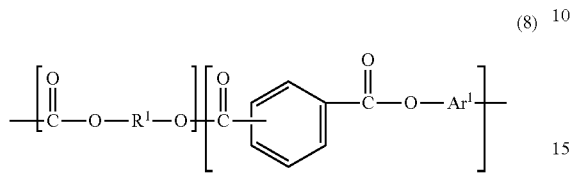

(8)

wherein $R^1$ and $Ar^1$ are as defined in formulas (1) and (7), respectively.

In general, the copolymers are block copolymers containing carbonate blocks and ester blocks. The weight ratio of total ester units to total carbonate units in the copolymers can vary broadly, for example from 99:1 to 1:99, or from 95:5 to 5:95, specifically from 90:10 to 10:90, or more specifically from 90:10 to 50:50, depending on the desired properties of the thermoplastic composition. The molar ratio of isophthalate to terephthalate in the ester units of the copolymers can also vary broadly, for example from 0:100 to 100:0, or from 92:8 to 8:92, more specifically from 98:2 to 45:55, depending on the desired properties of the thermoplastic composition. For example, the weight ratio of total ester units to total carbonate can be 99:1 to 40:60, or 90:10 to 50:40, wherein the molar ratio of isophthalate to terephthalate is from 99:1 to 40:50, more specifically 98:2 to 45:55, depending on the desired properties of the thermoplastic composition.

Additional carbonate units derived from the dihydroxy compound used to form the arylate ester units (7) can also be present in the copolymers, for example in amounts of less than 20 mole %, less than 10 mole %, less than 5 mole %, or less than 1 mole % based on the total moles of units in the copolymer. It is also possible to have additional arylate ester units present derived from reaction of the phthalic acid with the dihydroxy compound used to form the carbonate units, for example in amounts of less than 20 mole %, less than 10 mole %, less than 5 mole %, or less than 1 mole % based on the total moles of units in the copolymer. In an embodiment, the combination of such additional carbonate units and such additional arylate ester units are present in an amount of less than 20 mole %, less than 10 mole %, less than 5 mole %, or less than 1 mole % based on the total moles of units in the copolymer.

A specific poly(carbonate-arylate ester) is a poly(carbonate-bisphenol arylate ester) comprising carbonate units (1), specifically bisphenol carbonate units, even more specifically bisphenol-A carbonate units and repeating bisphenol arylate ester units. Bisphenol arylate units comprise residues of phthalic acid and a bisphenol, for example a bisphenol (3). In an embodiment the bisphenol arylate ester units are of formula (7a)

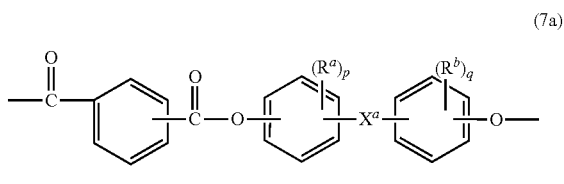

(7a)

wherein $R^a$ and $R^b$ are each independently $C_{1-12}$ alkyl, p and q are each independently 0 to 4, and $X^a$ is a bridging group between the two arylene groups, and is a single bond, —O—, —S—, —S(O)—, —S(O)$_2$—, —C(O)—, or a $C_{1-18}$ organic group. In an embodiment $X^a$ can be a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. For example, $R^a$ and $R^b$ are each independently a $C_{1-3}$ alkyl, p and q are each independently 0 or 1, and $X^a$ is alkylidene of formula —C($R^c$)($R^d$)— wherein $R^c$ and $R^d$ are each $C_{1-6}$ alkyl. In an embodiment, p and q is each 1, and $R^a$ and $R^b$ are each a $C_{1-3}$ alkyl group, specifically methyl, disposed meta to the oxygen on each ring. The bisphenol can be bisphenol-A, where p and q are both 0 and $X^a$ is isopropylidene. In an embodiment, the ratio of the weight percent of ester units to weight percent carbonate units in the copolymers is 50:50 to 99:1, or 55:45 to 90:10, or 75:25 to 95:5.

A specific example of a poly(carbonate-bisphenol arylate ester) is a poly(bisphenol-A carbonate)-co-poly(bisphenol-A phthalate ester) of formula (8a)

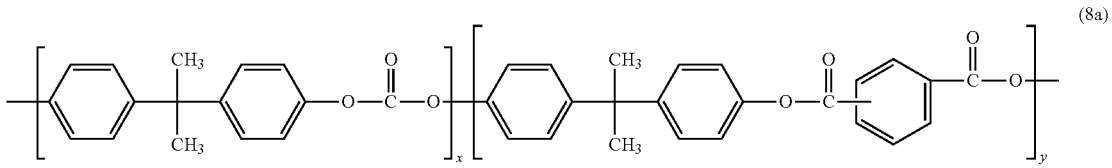

(8a)

wherein x and y represent the weight percent of bisphenol-A carbonate units and arylate-bisphenol-A ester units, respectively. Generally, the units are present as blocks. In an embodiment, the ratio of the weight percent carbonate units x to ester units y in the copolymers is 50:50 to 1:99, or 45:55 to 35:65, or 25:75 to 15:85. Thus, copolymers of formula (8a) comprising 35 to 45 wt % of carbonate units and 55 to 65 wt % of ester units, wherein the ester units have a molar ratio of isophthalate to terephthalate of 45:55 to 55:45 are often referred to as poly(carbonate-ester)s (PCE) and copolymers comprising 15 to 25 wt % of carbonate units and 75 to 85 wt % of ester units having a molar ratio of isophthalate to terephthalate from 98:2 to 88:12 are often referred to as poly(phthalate-carbonate)s (PPC).

In another embodiment, a specific poly(carbonate-arylate ester) is a poly(carbonate-monoaryl arylate ester) comprising carbonate units (1), specifically bisphenol carbonate units, even more specifically bisphenol-A carbonate units, and repeating monoaryl arylate-ester units of formula (7b)

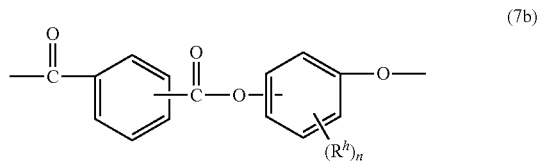

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate-monoaryl arylate) copolymers are of formula (8b)

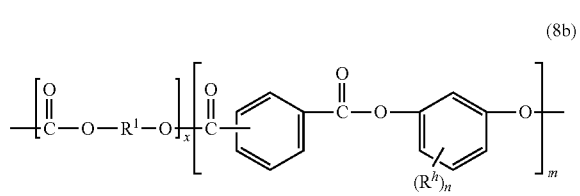

wherein $R^1$ is as defined in formula (1) and $R^h$, and n are as defined in formula (7b), and the mole ratio of x:m is 99:1 to 1:99, specifically 80:20 to 20:80, or 60:40 to 40:60.

A specific example of monoaryl ester unit (7b) is derived from the reaction of a phthalic diacid (or a derivative thereof) with resorcinol (or a reactive derivative thereof) to provide isophthalate-terephthalate-resorcinol ("ITR" ester units) of formula (7c)

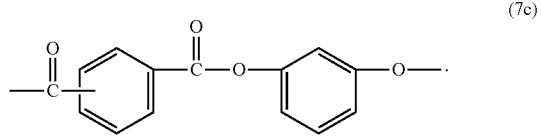

In an embodiment, the ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

As described above, the ITR-PC polymers can further optionally comprise small amounts of other carbonate units, for example 1 to 20 mole % of other carbonate units, based on the total moles of units in the copolymers. In an embodiment, the other carbonate unit arises from carbonylation of the monoaryl dihydroxy compound (6). Other arylate ester units can optionally be present, for example 1 to 20 mole % of bisphenol arylate ester units (7b), based on the total moles of units in the copolymers. The bisphenol arylate units can arise from the presence of a bisphenol used to form the carbonate units. In an embodiment, wherein the total amount of the combination is other carbonate units and other arylate ester units is 1 to 20 mole %, based on the total moles of units in the copolymers.

A specific example of a poly(carbonate)-co-poly (monoaryl arylate ester) is a poly(bisphenol-A carbonate)-co-poly(isophthalate-terephthalate-resorcinol ester) of formula (8c)

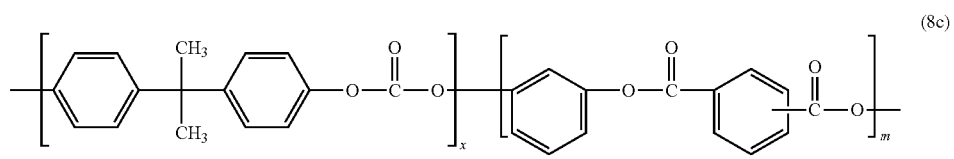

wherein m is 4 to 100, 4 to 90, 5 to 70, more specifically 5 to 50, or still more specifically 10 to 30, and the mole ratio of x:n is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination thereof can be present, in a total amount of 1 to 20 mole % based on the total moles of units in the copolymers, for example resorcinol carbonate units of the formula

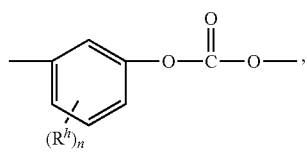

and bisphenol-A phthalate ester units of the formula

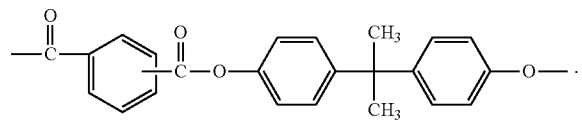

In an embodiment, poly(bisphenol-A carbonate)-co-poly(isophthalate-terephthalate-resorcinol ester) (8c) comprises 1 to 20 mol % of bisphenol-A carbonate units, 60-98 mol % of isophthalic acid-terephthalic acid-resorcinol ester units, and optionally 1 to 20 mol % of resorcinol carbonate units, isophthalic acid-terephthalic acid-bisphenol-A phthalate ester units, or a combination thereof.

The poly(carbonate-arylate ester) copolymers can be prepared by methods known in the art. For example, the copolymers are units can be prepared from polycarbonate blocks and polyester blocks. Polycarbonate blocks and polyester blocks can be obtained by interfacial polymerization or melt polymerization.

Polycarbonate blocks can be manufactured by processes such as interfacial polymerization and melt polymerization. Although the reaction conditions for interfacial polymerization can vary, an exemplary process generally involves dissolving or dispersing the dihydroxy reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like. Exemplary carbonate precursors include a carbonyl halide such as carbonyl bromide or carbonyl chloride or a haloformate such as a bishaloformates of a dihydric phenol (e.g., the bischloroformates of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 wt % based on the weight of bisphenol in the phosgenation mixture. In another embodiment an effective amount of phase transfer catalyst can be 0.5 to 2 wt % based on the weight of bisphenol in the phosgenation mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Combinations comprising linear and branched polycarbonate blocks can be used.

For the polyester blocks, rather than using the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The poly(carbonate-arylate ester)s can have a weight average molecular weight (Mw) of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of 1.0 ml/min with methylene chloride as the eluent.

In another embodiment, the poly(carbonate-arylate ester) copolymers further comprise siloxane units (also known as "diorganosiloxane units"). In a specific embodiment these copolymers comprises carbonate units (1) derived from a bisphenol (3), specifically bisphenol-A; monoaryl arylate ester units (7b), and siloxane units. Still more specifically, the poly(carbonate-arylate ester) copolymers comprises bisphenol-A carbonate units, ITR ester units (7c), and siloxane units (9). For convenience, these polymers, poly(bisphenol-A carbonate)-co-poly(isophthalate-terephthalate-resorcinol ester)-co-poly(siloxane), are referred to herein as "ITR-PC-siloxane" copolymers.

The polysiloxane units are of formula (9)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof. In an embodiment no halogens are present. Combinations of the foregoing R groups can be used in the same copolymer. In an embodiment, the polysiloxane comprises R groups that have minimal hydrocarbon content. In a specific embodiment, an R group with a minimal hydrocarbon content is a methyl group.

The average value of E in formula (9) can vary widely depending on the type and relative amount of each component in the thermoplastic composition, whether the polymer is linear, branched or a graft copolymer, the desired properties of the composition, and like considerations. In an embodiment, E has an average value of 2 to 500, 2 to 200, or 5 to 100, 10 to 100, or 10 to 80. In an embodiment E has an average value of 16 to 50, more specifically 20 to 45, and even more specifically 25 to 45. In another embodiment, E has an average value of 4 to 50, 4 to 15, specifically 5 to 15, more specifically 6 to 15, and still more specifically 7 to 10.

In an embodiment, the polysiloxane units are structural units of formula (9a)

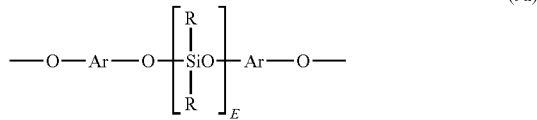

(9a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (9a) can be derived from a $C_{6-30}$ dihydroxy aromatic compound, for example a bisphenol compound as described above or a monoaryl dihydroxy compound (6) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a specific embodiment, where Ar is derived from resorcinol, the polysiloxane units are of the formula (9a-1)

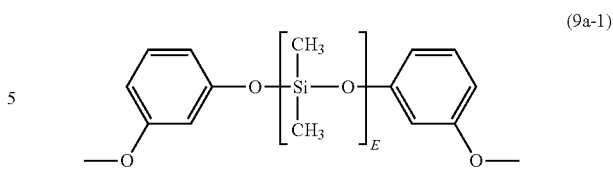

(9a-1)

or, where Ar is derived from bisphenol-A, the polysiloxane has the formula (9a-2)

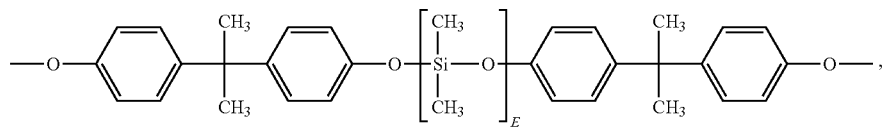

(9a-2)

or a combination comprising at least one of the foregoing can be used, wherein E has an average value as described above, specifically an average value of 2 to 200.

In another embodiment, polydiorganosiloxane units are units of formula (9b)

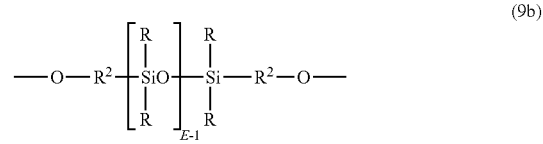

(9b)

wherein R and E are as described for formula (9), and each $R^2$ is independently a divalent $C_{1-30}$ alkylene or $C_{7-30}$ arylene-alkylene. In a specific embodiment, where $R^2$ is $C_{7-30}$ arylene-alkylene, the polydiorganosiloxane units are of formula (9b-1)

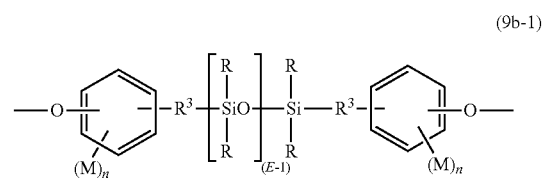

(9b-1)

wherein R and E are as defined for formula (9), and each $R^3$ is independently a divalent $C_{2-8}$ aliphatic group. Each M in formula (25) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

In a specific embodiment, the polysiloxane units are of formula (9b-2)

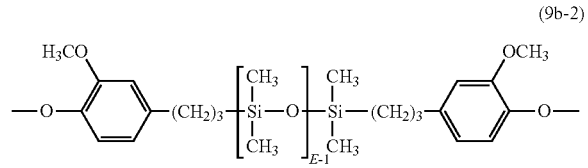

(9b-2)

where E has an average value as described above, specifically 5 to 80, more specifically 2 to 30. In another specific embodiment, the polysiloxane units are of formula (9b-3)

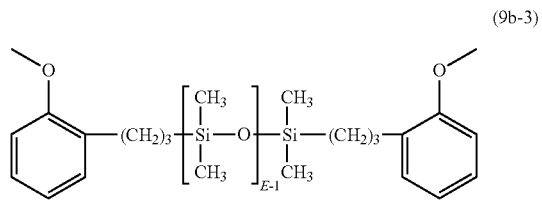

(9b-3)

where E has an average value as defined above, specifically an average value of 5 to 80 or an average value of 2 to 30.

The relative amount polysiloxane units (9) in the ITR-PC-siloxane copolymers depends on the desired properties of the thermoplastic composition, such as impact, smoke density, heat release, and melt viscosity. In particular the poly(carbonate-arylate ester) is selected to have an average value of E that provides good impact and/or transparency properties, as well as to provide the desired weight percent of siloxane units in the thermoplastic composition. For example, the poly(carbonate-arylate ester)s can comprise siloxane units in an amount of 0.3 to 30 weight percent (wt %), specifically 0.5 to 25 wt %, or 0.5 to 15 wt %, based on the total weight of the polymers in the thermoplastic composition, with the proviso that the siloxane units are provided by polysiloxane units covalently bonded in the polymer backbone of the poly(carbonate-arylate ester).

In an embodiment, the PC-ITR-siloxane copolymers comprise 1 to 40 mol %, or 1 to 20 mol % of bisphenol-A carbonate units, 50 to 95 mol % of ITR ester units (7c), and an amount of polysiloxane units (9b), specifically (9b-1), even more specifically (9b-1), (9b-2), or a combination thereof in an amount effective to provide 0.1 to 10 wt % of siloxane units, each based on the total copolymer. For example, the PC-ITR-siloxane copolymers can comprise 1 to 20 mol % of bisphenol-A carbonate units, 60 to 90 mole % of ITR ester units, and an amount of polysiloxane units (9b-2), (9b-3), or a combination thereof effective to provide 0.1 to 10 wt % of siloxane units, each based on the total copolymer.

Other carbonate units, other ester units, or a combination thereof can be present in the PC-ITR-siloxane copolymers, in a total amount of 1 to 20 mole % based on the total moles of units in the copolymers, for example resorcinol carbonate units, and bisphenol-A phthalate ester units of the formula. In an embodiment, the ITR-PC-siloxane comprises 1 to 20 mol % of bisphenol-A carbonate units, 60-98 mol % of isophthalic acid-terephthalic acid-resorcinol ester units, and optionally 1 to 20 mol % of resorcinol carbonate units (10), isophthalic acid-terephthalic acid-bisphenol-A ester units (11), or a combination thereof, together with the siloxane units.

Methods for the manufacture of the ITR-PC-siloxane copolymers are known. The ITR-PC-siloxane copolymers can have an intrinsic viscosity, as determined in chloroform at 25° C., of 0.3 to 1.5 deciliters per gram (dl/g), specifically 0.45 to 1.0 dl/g. The PC-siloxane copolymers can have a weight average molecular weight ($M_w$) of 10,000 to 100,000 g/mol, determined according to gel permeation chromatography (GPC) using a cross linked styrene-divinyl benzene column, at a sample concentration of 1 milligram per milliliter, and as calibrated with polycarbonate standards.

The low heat release thermoplastic compositions comprise the above-described poly(carbonate-arylate ester)s in combination with an organophosphorus flame retardant in an amount effective to provide 0.1 to 1.0 wt % phosphorus, based on the weight of the composition. Such compounds include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more non-aromatic moieties, for example alkyl, alkenyl, alkynyl, or cycloalkyl. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol-A), a monoarylene group (e.g., a 1,3-phenylene or a 1,4-phenylene), or a combination comprising at least one of the foregoing.

The phosphorus-containing group can be a phosphate ($P(=O)(OR)_3$), phosphite ($P(OR)_3$), phosphonate ($RP(=O)(OR)_2$), phosphinate ($R_2P(=O)(OR)$), phosphine oxide ($R_3P(=O)$), or phosphine ($R_3P$), wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P=O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl)phosphate, phenyl bis(neopentyl)phosphate, phenyl bis(3,5,5'-trimethylhexyl) phosphate, ethyl diphenyl phosphate, 2-ethylhexyl di(p-tolyl) phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of formula (14)

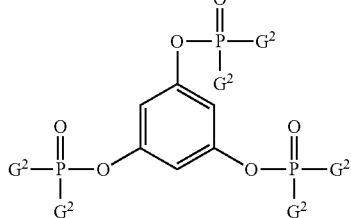
(14)

wherein each $G^2$ is independently a hydrocarbon or hydrocarbonoxy having 1 to 30 carbon atoms. In some embodiments G corresponds to a monomer used to form the polycarbonate, e.g., resorcinol.

Specific aromatic organophosphorus compounds have two or more phosphorus-containing groups, and are inclusive of acid esters of formula (15)

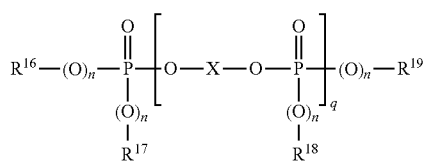
(15)

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}$, $R^{18}$, and $R^{19}$ are each independently $C_{1-4}$ alkyl, naphthyl, phenyl($C_{1-4}$)alkylene, or aryl groups optionally substituted by $C_{1-4}$ alkyl. Specific aryl moieties are cresyl, phenyl, xylenyl, propylphenyl, or butylphenyl. In some embodiments X in formula (15) is a mono- or poly-nuclear aromatic $C_{6-30}$ moiety derived from a diphenol. Further in formula (15), n is each independently 0 or 1; in some embodiments n is equal to 1. Also in formula (15), q is from 0.5 to 30, from 0.8 to 15, from 1 to 5, or from 1 to 2. Specifically, X can be represented by the following divalent groups (16), or a combination comprising one or more of these divalent groups,

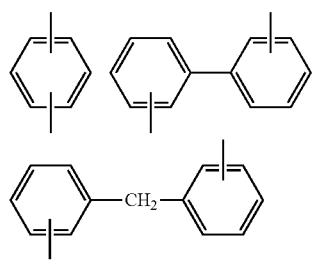
(16)

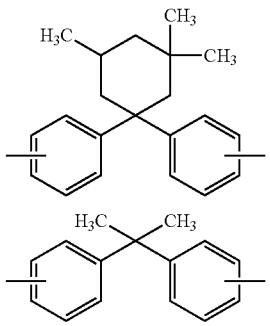

wherein the monophenylene and bisphenol-A groups can be specifically mentioned.

In these embodiments, each of $R^{16}$, $R^{17}$, $R^{18}$, and $R^{19}$ can be aromatic, i.e., phenyl, n is 1, and p is 1-5, specifically 1-2. In some embodiments at least one of $R^{16}$, $R^{17}$, $R^{18}$, $R^{19}$, and X corresponds to a monomer used to form the polycarbonate, e.g., bisphenol-A or resorcinol. In another embodiment, X is derived especially from resorcinol, hydroquinone, bisphenol-A, or diphenylphenol, and $R^{16}$, $R^{17}$, $R^{18}$, $R^{19}$, is aromatic, specifically phenyl. A specific aromatic organophosphorus compound of this type is resorcinol bis(diphenyl phosphate), also known as RDP. Another specific class of aromatic organophosphorus compounds having two or more phosphorus-containing groups are compounds of formula (17)

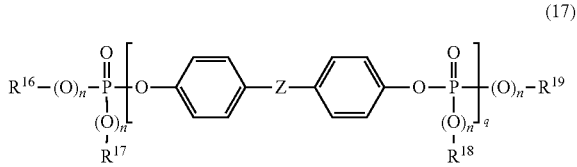
(17)

wherein $R^{16}$, $R^{17}$, $R^{18}$, $R^{19}$, n, and q are as defined for formula (19) and wherein Z is $C_{1-7}$ alkylidene, $C_{1-7}$ alkylene, $C_{5-12}$ cycloalkylidene, —O—, —S—, —SO$_2$—, or —CO—, specifically isopropylidene. A specific aromatic organophosphorus compound of this type is bisphenol-A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Organophosphorus compounds containing at least one phosphorus-nitrogen bond includes phosphazenes, phosphorus ester amides, phosphoric acid amides, phosphonic acid amides, phosphinic acid amides, and tris(aziridinyl)phosphine oxide. Phosphazenes (18) and cyclic phosphazenes (19)

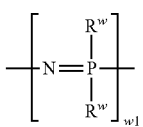
(18)

-continued

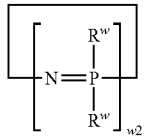
(19)

in particular can used, wherein w1 is 3 to 10,000 and w2 is 3 to 25, specifically 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

Accordingly, depending on the particular organophosphorus compound used, the thermoplastic compositions can comprise from 2 to 12 wt %, or 0.3 to 8.5 wt %, or 0.5 to 8.0 wt %, or 3.5 to 7.5 wt % of the organophosphorus flame retardant, each based on the total weight of the composition. Specifically, the organophosphorus compounds can be bisphenol A bis(diphenyl phosphate), triphenyl phosphate, resorcinol bis(diphenyl phosphate), tricresyl phosphate, or a combination comprising at least one of the foregoing.

The thermoplastic compositions can include various additives ordinarily incorporated into flame retardant compositions having low smoke density and low heat release, with the proviso that the additive(s) are selected so as to not adversely affect the desired properties of the thermoplastic composition significantly, in particular low smoke density and low heat release. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, additional flame retardants, and anti-drip agents. A combination of additives can be used. In general, the additives are used in the amounts generally known to be effective. The total amount of additives (other than any filler or reinforcing agents) is generally 0.01 to 25 parts per parts per hundred parts by weight of the polymers (PHR).

The use of pigments such as titanium dioxide produces white compositions, which are commercially desirable. Pigments such as titanium dioxide (or other mineral fillers) can be present in the thermoplastic compositions in amounts of 0 to 12 PHR, 0.1 to 9 PHR, 0.5 to 5 PHR, or 0.5 to 3 PHR.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 PHR.

Exemplary heat stabilizer additives include organophosphites such as triphenyl phosphite, tris-(2,6-dimethylphenyl) phosphite, and tris-(mixed mono- and di-nonylphenyl)phosphite; phosphonates such as dimethylbenzene phosphonate, phosphates such as trimethyl phosphate; or combinations comprising at least one of the foregoing heat stabilizers. Heat stabilizers are used in amounts of 0.01 to 0.1 PHR.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 PHR.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to 100 nanometers; or combinations comprising at least one of the foregoing UV absorbers. UV absorbers are used in amounts of 0.01 to 5 PHR.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl) isocyanurate; tristearin; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly (ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 PHR.

Flame retardant salts are not needed in order to obtain the desired low smoke and heat release characteristics. Flame retardant salts include, for example, salts of $C_{1-16}$ alkyl sulfonate salts such as potassium perfluorobutane sulfonate (Rimar salt), potassium perfluorooctane sulfonate (KSS), tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, inorganic phosphate salts, and fluoro-anion complexes such as $Li_3AlF_6$, $BaSiF_6$, $KBF_4$, $K_3AlF_6$, $KAlF_4$, $K_2SiF_6$, and/or $Na_3AlF_6$. In an embodiment, no or substantially no flame retardant inorganic salts are present in the thermoplastic compositions.

Organic flame retardants can be present, but halogenated flame retardants are generally avoided, such that the thermoplastic composition can be essentially free of chlorine and bromine. "Essentially free of chlorine and bromine" as used herein means having a bromine and/or chlorine content of less than or equal to 100 parts per million by weight (ppm), less than or equal to 75 ppm, or less than or equal to 50 ppm, based on the total parts by weight of the composition, excluding any filler.

Anti-drip agents in most embodiments are not used in the thermoplastic compositions. Anti-drip agents include a fibril-forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. Antidrip agents are substantially absent or completely absent from the thermoplastic compositions in some embodiments.

Methods for forming the thermoplastic compositions can vary. In an embodiment, the polymers are combined (e.g., blended) with any additives (e.g., a mold release agent) such as in a screw-type extruder. The polymers any additives can be combined in any order, and in form, for example, powder, granular, filamentous, as a masterbatch, and the like. Transparent compositions can be produced by manipulation of the process used to manufacture the thermoplastic composition. One example of such a process to produce transparent thermoplastic compositions is described in U.S. Pat. No. 7,767,738, incorporated herein by reference in its entirety. The thermoplastic compositions can be foamed, extruded into a sheet, or optionally pelletized. Methods of foaming a thermoplastic composition using frothing or physical or chemical blowing agents are known and can be used. The pellets can be used for molding into articles, foaming, or they can be used in forming a sheet of the flame retardant thermoplastic composition. In some embodiments, the composition can be extruded (or co-extruded with a coating or other layer) in the form of a sheet and/or can be processed through calendaring rolls to form the desired sheet.

As discussed above, the thermoplastic compositions are formulated to meet strict heat release and smoke density requirements. The relative amounts of poly(carbonate-arylate ester) and organophosphorus compound in the thermoplastic compositions depends on the particular copolymer and organophosphorus compound used, the heat release and smoke density, and other desired properties of the thermoplastic composition, such as impact strength and flow. In an embodiment, the organophosphorus compound is present in an amount from 2 to 12 wt %, based on the total weight of the thermoplastic composition, and within this range the specific amount is selected to be effective to provide a maximum average rate of heat emission (MAHRE) of 90 kW/m² or less, 75 kW/m² or less, 60 kW/m² or less, or 50 kW/m² or less as measured according to ISO 5660-1 on a 3 mm thick plaque, and a Ds-4 of 300 or less, 250 or less, 200 or less, 150 or less, or 100 or less determined in accordance with ISO 5659-2 on a 3 mm thick plaque. These values can be obtained in articles having a wide range of thicknesses, for example from 0.1 to 10 mm, or 0.5 to 5 mm.

Use of the organophosphorus compound can lower heat release, smoke density, or both to the desired levels. Thus, in some embodiments the compositions can have a MAHRE of 90 kW/m² or less s measured according to ISO 5660-1 on a 3 mm thick plaque and a Ds-4 smoke density of 300 or less as measured according to ISO 5659-2 on a 3 mm thick plaque and a Ds-4 smoke density of 300 or less as measured according to ISO 5659-2 on a 3 mm thick plaque, resulting in R6 applications in compliance with Hazard Level 2 rating for the EN45545 (2013) standard; a MAHRE of 60 kW/m² or less as measured according to ISO 5660-1 on a 3 mm thick plaque and a Ds-4 smoke density of 150 or less as measured according to ISO 5659-2 on a 3 mm thick plaque, resulting in R6 applications in compliance with Hazard Level 3 rating for the EN45545 (2013) norm. For example, these values can be obtained when the poly(carbonate-arylate) is an ITR-PC comprising bisphenol-A carbonate units and ITR ester units, or an ITR-PC-siloxane comprising bisphenol-A carbonate units, ITR ester units, and siloxane units (9b-2), (9b-3), or a combination thereof as described above, and an aromatic organophosphorus compound, e.g., RDP, BPADP, or a combination comprising at least one of the foregoing aromatic organophosphorus compounds. These values can be obtained in articles having a wide range of thicknesses, for example from 0.1 to 10 mm, or 0.5 to 5 mm.

The thermoplastic compositions can be formulated to have lower densities, in particular a density of 1.35 g/cc or less, 1.34 g/cc or less, 1.33 g/cc or less, 1.32 g/cc or less, 1.31 g/cc or less, 1.30 g/cc or less, or 1.29 g/cc or less. The same or similar values can be obtained in articles having a wide range of thicknesses, for example from 0.1 to 10 mm, or 0.5 to 5 mm.

The thermoplastic compositions can further have good melt viscosities, which aid processing. The thermoplastic compositions can have a melt volume flow rate (MVR, cubic centimeter per 10 minutes (cc/10 min), of 4 to 30, greater than or equal to 12, greater than or equal to 10, greater than or equal to 15, greater than or equal to 16, greater than or equal to 17, greater than or equal to 18, greater than or equal to 19, or greater than or equal to 20 cc/min, measured at 300° C./1.2 Kg at 360 second dwell according to ISO 1133. The same or similar values can be obtained in articles having a wide range of thicknesses, for example from 0.1 to 10 mm, or 0.5 to 5 mm.

The thermoplastic compositions can further have excellent impact properties, in particular multiaxial impact (MAI) and ductility, which provides information on how the compositions behave under multiaxial deformation conditions. The deformation applied can be a high-speed puncture. Properties reported include total energy absorbed, which is expressed in Joules (J) and ductility of parts in percent (% D) based on whether the part fractured in a brittle or ductile manner. A ductile part shows yielding where it is penetrated by the tip, a brittle part splits into pieces or has a section punched out that shows no yielding. The thermoplastic compositions can have an MAI equal to or higher than 100 J, determined at 23° C. at an impact speed of 4.4 m/second in accordance with ISO 6603 on discs with a thickness of 3.2 mm. The compositions can have a ductility in multiaxial impact of 80% and higher, determined at 23° C. at an impact speed of 4.4 m/second in accordance with ISO 6603 on discs with a thickness of 3.2 mm. The same or similar values can be obtained in articles having a wide range of thicknesses, for example from 0.1 to 10 mm, but particularly at 0.5 to 5 mm.

The thermoplastic compositions can further have excellent impact strength, particularly when the average value of E is higher, i.e., 25 to 200, 25 to 100, or 25 to 50. Such compositions often have higher siloxane levels, i.e., at least 2.0 wt %, specifically 2.0 to 10 wt %, 2.0 to 8 wt %, or 2.0 to 6 wt %, each based on the total weight of the polymers in the thermoplastic composition. An article molded from the thermoplastic compositions can have a notched Izod impact of greater than 10 kJ/m$^2$ as measured according to ISO 180/1A at 23° C., 5.5 J, on impact bars with a 4 mm thickness. The same or similar values can be obtained in articles having a wide range of thicknesses, for example from 0.1 to 10 mm, but particularly at 0.5 to 5 mm.

The thermoplastic compositions can further be formulated to have a haze less than 3%, or less than 2%, and a transmission greater than 85%, each measured using the color space CIE1931 (Illuminant C and a 2° observer) or according to ASTM D 1003 (2007) using illuminant C at a 0.062 inch (1.5 mm) thickness. In some embodiments, the thermoplastic compositions can be formulated such that an article molded from the composition has both a haze less of than 3% and a transmission of greater than 85%, each measured using the color space CIE1931 (Illuminant C and a 2° observer) or according to ASTM D 1003 (2007) using illuminant C at a 0.125 inch (3.2 mm) thickness. In some embodiments the articles can have all three of a haze less of than 3%, a transmission of greater than 85%, and an MAI equal to or higher than 100 J, determined at 23° C. at an impact speed of 4.4 m/second in accordance with ISO 6603 on discs with a thickness of 3.2 mm.

Shaped, formed, or molded articles comprising the thermoplastic compositions are also provided. The thermoplastic compositions can be molded into useful shaped articles by a variety of means such as injection molding, extrusion, rotational molding, blow molding, and thermoforming to form articles. Thus the thermoplastic compositions can be used to form a foamed article, a molded article, a thermoformed article, an extruded film, an extruded sheet, a layer of a multilayer article, e.g., a cap-layer, a substrate for a coated article, or a substrate for a metallized article. These values can be obtained in articles having a wide range of thicknesses, for example from 0.1 to 10 mm, or 0.5 to 5 mm.

Illustrative articles include access panels, access doors, air flow regulators air gaspers, air grilles, arm rests, baggage storage doors, balcony components, cabinet walls, ceiling panels, door pulls, door handles, duct housing, enclosures for electronic devices, equipment housings, equipment panels, floor panels, food carts, food trays, galley surfaces, grilles, handles, housings for TVs and displays, light panels, magazine racks, telephone housings, partitions, parts for trolley carts, seat backs, seat components, railing components, seat housings, shelves, side walls, speaker housings, storage compartments, storage housings, toilet seats, tray tables, trays, trim panel, window moldings, window slides, windows, and the like.

In an embodiment, the thermoplastic compositions are formulated to provide articles that meet certain criteria set forth in European Railway standard EN-45545 (2013). The European Union has approved the introduction of a set of fire testing standards for the railroad industry that prescribes certain flammability, flame spread rate, heat release, smoke emission, and smoke toxicity requirements for materials used in railway vehicles, known as European Railway standard EN-45545 (2013). Based on the vehicle material, end-use, and fire risks, 26 different "Requirement" categories for materials have been established (R1-R26).

Passenger seat shells (both back and base shell) fall under the R6 application type. Lighting strips fall under the R3 application type. The R1 application type covers, amongst others, interior vertical and horizontal surfaces, such as side walls, front/end walls, doors, ceiling panels, as well as luggage racks, linings and frames.

"Hazard Levels" (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (easy evacuation of the vehicle). HL3 is the highest hazard level and represents most dangerous operation/design categories (difficult and/or time-consuming evacuation of the vehicle, e.g. in underground rail cars). For each application type, different test requirements for the hazard levels are defined. The testing methods, and smoke density and maximum heat release rate values for the various hazard levels in the European Railway standard EN-45545 (2013) are shown in Table 1 for R6 applications.

TABLE 1

| European Railways Standard EN 45545 for R6 applications | | |
|---|---|---|
| Hazard Level | Smoke Density, DS-4 ISO 5659-2 | Heat release, MAHRE (kW/m$^2$) ISO 5660-1 |
| HL1 | ≤600 | — |
| HL2 | ≤300 | ≤90 |
| HL3 | ≤150 | ≤60 |

Data in the Examples shows that the compositions herein can meet the requirements for HL2, and some compositions can meet the requirements for HL3.

Thus, while thermoplastic compositions can be used for the manufacture of a wide variety of articles, including high occupancy structures such as rail stations, airports and office buildings, the thermoplastic compositions are especially useful for the manufacture of transportation components.

As used herein, a "transportation component" is an article or portion of an article used in rolling stock, an aircraft, a roadway vehicle, or a marine vehicle. "Rolling stock" includes but is not limited to a locomotive, coach, light rail vehicle, underground rail vehicle, tram, trolley, magnetic levitation vehicle, and a cable car. An "aircraft" includes but is not limited to a jet, an airplane, an airship, a helicopter, a balloon, and a spacecraft. A "roadway vehicle" includes but is not limited to an automobile, bus, scooter and a motorcycle. A "marine vehicle" includes but is not limited to a boat, a ship (including freight and passenger ships), jet skis, and a submarine.

Exemplary transportation components for rolling stock (e.g., trains), aircraft, and roadway and marine vehicles, particularly rolling stock, includes interior components (e.g., structure and coverings) such as ceiling paneling, flaps, boxes, hoods, louvers, insulation material and the body shell in interiors, side walls, front walls/end walls, partitions, room dividers, interior doors, interior lining of the front-/end-wall doors and external doors, luggage overhead luggage racks, vertical luggage rack, luggage container, luggage compartments, windows, window frames, kitchen interiors, surfaces or a component assembly comprising at least one of the foregoing. In an embodiment any of the foregoing articles are in compliance with European Rail Standard EN-45545, for example meeting HL2 or HL3.

The thermoplastic compositions are particularly useful in train and aircraft, for example a variety of aircraft compartment interior applications, as well as interior applications for other modes of transportation, such as bus, train, subway, marine, and the like. In a specific embodiment the articles are interior components for aircraft or trains, including access panels, access doors, air flow regulators baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, and the like. The poly(siloxane) copolymer compositions can be formed (e.g., molded) into sheets that can be used for any of the above mentioned components. It is generally noted that the overall size, shape, thickness, optical properties, and the like of the polycarbonate sheet can vary depending upon the desired application. In an embodiment any of the foregoing articles are in compliance with European Rail Standard EN-45545, for example meeting HL2 or HL3.

In an embodiment, provided herein is a thermoplastic composition comprising, based on the total weight of the composition, 88 to 98 wt % of a combination of a poly(bisphenol-A carbonate)-co-poly(isophthalate-terephthalate-resorcinol ester) and a poly(bisphenol-A carbonate)-co-poly(isophthalate-terephthalate-resorcinol ester)-co-poly(siloxane), each present in an amount of 20 to 80 wt % of the combination; and 2 to 12 wt %, or 0.3 to 8.5 wt % of an organophosphorus compound effective to provide 0.1 to 1.0 wt % phosphorus based on the total weight of the composition, specifically BPADP or RDP; and optionally up to 5 wt % of an additive selected from a processing aid, a heat stabilizer, an ultra violet light absorber, a colorant, or a combination comprising at least one of the foregoing, wherein the component has a smoke density Ds-4 value of less than 300 determined according to ISO 5659-2 on a 3 mm thick plaque, and a maximum average heat release (MAHRE) of less than 90 kW/m$^2$ determined according to ISO 5660-1 on a 3 mm thick plaque, and optionally, a 3.2-millimeter sample molded from the composition has a multiaxial impact of greater than 100 measured at 23° C., 4.4 m/sec in accordance with ISO 6603. The same or similar values can be obtained in components having a wide range of thicknesses, for example from 0.1 to 10 mm, or 0.5 to 5 mm. These thermoplastic compositions are especially useful in the manufacture of a transportation component, in particular a train component.

Likewise, provided herein is a thermoplastic composition comprising, based on the total weight of the composition, 2 to 12 wt %, or 0.3 to 8.5 wt % of an organophosphorus compound effective to provide 0.1 to 1.0 wt % phosphorus based on the total weight of the composition, specifically BPADP or RDP; 88 to 98 wt % of a poly(bisphenol-A carbonate)-co-poly(isophthalate-terephthalate-resorcinol ester); and optionally up to 5 wt % of an additive selected from a processing aid, a heat stabilizer, an ultra violet light absorber, a colorant, or a combination comprising at least one of the foregoing, wherein the component has a maximum average heat release (MAHRE) of less than or equal to 90 kW/m$^2$ determined according to ISO 5660-1 on 3 mm thick plaque and a Ds-4 smoke density of less than or equal to 300 determined according to ISO 5659-2 on a 3 mm thick plaque. The same or similar values can be obtained in train components having a wide range of thicknesses, for example from 0.1 to 10 mm, or 0.5 to 5 mm. These thermoplastic compositions are especially useful in the manufacture of a transportation component, in particular a train component.

In another embodiment a thermoplastic composition comprises, based on the total weight of the composition, 88 to 98 wt % of a poly(bisphenol-A carbonate)-co-poly(isophthalate-terephthalate-resorcinol ester)-co-poly(siloxane); 2 to 12 wt % of an aromatic organophosphorus compound such as BPADP or RDP; and optionally, up to 5 wt % of an additive selected from a processing aid, a heat stabilizer, an ultra violet light absorber, a colorant, or a combination comprising at least one of the foregoing, wherein an article having a thickness of 0.5 to 10 mm molded from the composition has a Ds-4 smoke density of less than or equal to 150 determined according to ISO 5659-2 on a 3 mm thick plaque, and a MAHRE of less than or equal to 60 kW/m$^2$ determined according to ISO 5660-1 on a 3 mm thick plaque. The same or similar values can be obtained in train components having a wide range of thicknesses, for example from 0.1 to 10 mm, or 0.5 to 5 mm. These thermoplastic compositions are especially useful in the manufacture of a transportation component, in particular a train component.

The thermoplastic compositions having low heat release rates determined according to ISO 5660-1 and low smoke densities determined according to ISO 5659-2 are further illustrated by the following non-limiting examples, which use the following components.

EXAMPLES

The materials used in the Examples are described in Table 2. Amounts of components are in wt %, unless otherwise indicated.

TABLE 2

| Component | Trade name; chemical description | Source |
|---|---|---|
| PC | Bisphenol A homopolycarbonate, having an Mw of 27,000 to 33,000 g/mol as determined by GPC using polycarbonate standards | SABIC |
| ITR-PC | ITR (Isophthalic acid-terephthalic acid-resorcinol)-bisphenol A copolyestercarbonate copolymer, ester content 83 mol %, interfacial polymerization, Mw 19,000 to 23,000 g/mol, para-cumyl phenol end-capped | SABIC |
| ITR-PC-Si | Polysiloxane-ITR (Isophthalic acid-terephthalic acid-resorcinol)-bisphenol-A copolyestercarbonate copolymer, ester content 83 mol %, siloxane content 1 wt % (average siloxane chain length about 10), interfacial polymerization, Mw = 22,500 to 26,500 g/mol, para-cumyl phenol end-capped | SABIC |
| PC-Ester | Poly(phthalate-carbonate) copolymer, 60-85 mol % ester units, Mw 27,500 to 30,000 g/mol (determined via GPC using polycarbonate standards), manufactured via interfacial polymerization | SABIC |
| BPADP | CR-741; Bisphenol A diphosphate | Nagase (Europe) GmbH |
| RDP | FyrfolEX; Tetraphenyl resorcinol diphosphate | ICL-IP Europe |
| PEPQ | Tetrakis(2,4-di-tert-butylphenyl)[1,1-biphenyl]-4,4'diylbisphosphonite | Clariant |
| TiO$_2$ | Coated titanium dioxide | DuPont |

TABLE 2-continued

| Component | Trade name; chemical description | Source |
|---|---|---|
| Carbon black | Amorphous Carbon | Cabot |
| TP100 | Songflame TP-100; phenol/bi-phenol polyphosphate | Songwon Industrial |
| Boron phosphate | Boron orthophosphate | Budenheim |

The tests performed are summarized in Table 3.

TABLE 3

| Description | Test | Specimen | Property | Units |
|---|---|---|---|---|
| ISO Smoke density | ISO 5659-2 | plaque 75 × 75 × 3 mm | Ds-4 | — |
| ISO Heat release | ISO 5660-1 | plaque 100 × 100 × 3 mm | MAHRE | kW/m$^2$ |
| OSU Peak Heat release | FAR25.853 | plaque 15.2 × 15.2 cm × 3 mm | 2 Min/Peak Rate | kW/m$^2$ |
| ASTM Smoke density | ASTM E662 | plaque 75 × 75 × 3 mm | Ds-4 | — |
| Melt volume flow rate at 300° C., 1.2 Kg | ISO 1133 | Pellets | MVR | cc/10 min |
| Izod Notched Impact, 23° C., 5.5 J | ISO 180/1A | Multi-purpose ISO 3167 Type A, 4 mm thickness | INI | kJ/m$^2$ |
| Multiaxial Impact, 23° C., 4.4 m/s | ISO 6603 | Disc, 3.2 mm thickness, 100 mm diameter | MAI | J |

ISO smoke density measurements were performed on 7.5× 7.5 cm plaques with 3 mm thickness using an NBS Smoke Density Chamber from Fire Testing Technology Ltd (West Sussex, United Kingdom). All measurements were performed according to ISO 5659-2, with an irradiance of 50 kW/m$^2$ at the sample position and a sample-to-cone distance of 5 cm in view of the charring behavior of the samples (as prescribed by ISO 5659-2). Ds-4 was determined as the measured smoke density after 240 seconds.

ISO heat release measurements were performed on 10×10 cm plaques with 3 mm thickness using a Cone calorimeter. All measurements were performed according to ISO 5660-1, with 50 kW/m$^2$ irradiance at the sample position and a sample-to-cone distance of 6 cm in view of the charring behavior of the samples (as prescribed by ISO 5660-1). Heat release is measured as MAHRE in kW/m$^2$ as prescribed by ISO5660-1.

Smoke density testing (ASTM E-662-83, ASTM F-814-83, Airbus ABD0031, Boeing BSS 7239) was performed on 7.5×7.5 cm plaques of 3 mm thickness according to the method shown in FAR 25.853 (d), and in Appendix F, section V (FAR F25.5). Smoke density was measured under flaming mode. Smoke density (Ds) at 4.0 minutes (min) was reported.

OSU peak heat release testing was performed on 15.2×15.2 cm plaques of 3 mm thickness, using the Ohio State University (OSU) rate-of-heat release apparatus, in accordance with the method shown in FAR 25.853(d), and in Appendix F, section IV (FAR F25.4). Total heat release was measured at the two-minute mark in kW-min/m$^2$ (kilowatt minutes per square meter). Peak heat release was measured as kW/m$^2$ (kilowatts per square meter). The heat release test method is also described in the "Aircraft Materials Fire Test Handbook" DOT/FAA/AR-00/12, Chapter 5 "Heat Release Test for Cabin Materials."

The tests executed are indicative tests. They were performed according to their respective ISO, ASTM, and OSU standards, but were not executed by an officially certified test institute.

Blending, Extrusion and Molding Conditions.

The compositions were made as follows. All solid additives (stabilizers, colorants, solid flame retardants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid flame retardants (e.g., BPADP, RDP) were fed before the vacuum using a liquid injection system. It will be recognized by one skilled in the art that the method is not limited to these temperatures or processing equipment.

Extrusion of all materials was performed on a 27 mm Werner-Pfleiderer ZAK twin-screw extruder (L/D ratio of 33/1) with a vacuum port located near the die face. The extruder has 9 zones, which were set at temperatures of 40° C. (feed zone), 200° C. (zone 1), 250° C. (zone 2), and 270° C. (zone 3) and 280-300° C. zone 4 to 8. Screw speed was 300 rpm and throughput was between 15 and 25 kg/hr.

The compositions were molded after drying at 100-110° C. for 6 hrs on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

Examples 1-4

Examples 1-4 demonstrate the effect of the addition of an aromatic organophosphorus compound (BPADP) to poly (carbonate-arylate ester)s with high ITR contents, namely a blend of ITR-PC-siloxane and ITR-PC copolymers. Formulations and results are shown in Table 4.

TABLE 4

| | Unit | Ex1 | Ex2 | CEx3 | CEx4 |
|---|---|---|---|---|---|
| Component | | | | | |
| ITR-PC-Si | % | 47.05 | 45.17 | 48.92 | 42.92 |
| ITR-PC | % | 47.05 | 45.17 | 48.92 | 42.92 |
| PEPQ | % | 0.06 | 0.06 | 0.06 | 0.06 |
| Coated TiO$_2$ | % | 2.00 | 2.00 | 2.00 | 2.00 |
| Carbon black | % | 0.10 | 0.10 | 0.10 | 0.10 |

TABLE 4-continued

|  | Unit | Ex1 | Ex2 | CEx3 | CEx4 |
|---|---|---|---|---|---|
| PC105Br | % | 0 | 0 | 0 | 12 |
| BPADP | % | 3.75 | 7.5 | 0 | 0 |
| Property |  |  |  |  |  |
| MAI, 4.4 m/s | J | 131 | 136 | 106 | 129 |
| MVR, 300° C., 1.2 kg | cc/10' | 10.1 | 13.5 | 6.9 | 6.4 |
| Ds-4 ISO 5659-2 | — | 123 | 143 | 158 | 155 |
| MAHRE ISO5660-1 | — | 52 | 65 | 96 | 106 |
| Ds-4 ASTM E662 | — | n.a. | 162 | 29 | 52 |
| FAR25.853(d) (OSU) | — | n.a. | 40 | 46 | n.a. |

The results shown in Table 4 demonstrate that in the absence of an aromatic organophosphorus compound (BPADP), the blend of ITR-PC and ITR-PC-siloxane copolymers (CEx3) has a smoke density (Ds-4 of 158) at 3 mm thickness that meets the requirements for HL-2 in the European Railway standard EN-45545 (Ds-4 at or below 300). The same or similar values are expected in compositions forming articles having a wide range of thicknesses, for example from 0.1 to 10 mm, or 0.5 to 5 mm. However, the heat release (MAHRE of 96 kW/m$^2$ at 3 mm thickness) does not meet the requirements for HL-2 in the European Railway standard EN-45545 (MAHRE at or below 90 kW/m$^2$ at 3 mm thickness).

As shown in Table 4, the addition of an aromatic organophosphorus compound (BPADP in these examples) to the blend of ITR-PC-siloxane and ITR-PC (Ex1, Ex2) yields slightly improved Ds-4 values in the ISO 5659-2 smoke density test compared to the Comparative Example (CEx3) without the aromatic organophosphorus compound.

In contrast, in the ASTM E662 smoke density test, the addition of an aromatic organophosphorus compound, such as BPADP, has a clear negative effect, increasing Ds-4 values from 29 in the composition with the aromatic organophosphorus compound to 162 in the composition without the aromatic organophosphorus compound (Ex2 and CEx3), all measured at 3 mm thickness.

The main effect of the addition of an aromatic organophosphorus compound (BPADP) is the highly positive effect on the heat release (MAHRE), reducing it from a values of 96 for the blend of ITR-PC-siloxane and ITR-PC without an aromatic organophosphorus compound (CEx3) down to MAHRE values of 52 (Ex1) and 65 (Ex2) at 3 mm thickness. The reduction in MAHRE values makes these materials suitable for Hazard Level 2 (HL-2) (Ds-4≤300 and MAHRE≤90 kW/m$^2$) or potentially even HL-3 (Ds-4≤150 and MAHRE≤60 kW/m$^2$) in the European Railway standard EN-45545 for class R6 applications (2013), whereas the blend of ITR-PC-siloxane and ITR-PC copolymers (CEx3) without an aromatic organophosphorus compound either does not comply or complies only marginally with HL-2 of European Railway standard EN-45545 standard.

The aromatic organophosphorus compound does not have this positive effect in the OSU peak heat release test (Ex2 and CEx3) with the measured OSU values very comparable for Ex2 (40) and CEx3 (46), all measured at 3 mm thickness.

An additional advantage of the addition of aromatic organophosphorus compounds, such as BPADP, is that it provides a significant improvement in the melt flow properties compared to the blend of ITR-PC-siloxane and ITR-PC without an aromatic organophosphorus compound. The improvement in MVR, measured at 300° C. and 1.2 kg according to ISO 1133, is from 6.9 (CEx3) to 10.1 (Ex1) or 13.5 (Ex2), without compromising multiaxial impact (MAI) at room temperature, as shown in Table 4.

Comparative Example 4 (CEx4), shows that improvement in reducing heat release values is unexpected and is not necessarily observed in other conventional flame-retardants, such as brominated polymers. The addition of a brominated polycarbonate (Br-PC) to the formulation actually results in a worse heat release, as shown for the blend of ITR-PC and ITR-PC-siloxane (CEx4). Comparing (CEx4) with (CEx3) shows that the addition of brominated polycarbonate actually results in an increase in MAHRE from 96 to 106 kW/m$^2$ at 3 mm thickness. Furthermore, the use of a brominated polycarbonate flame retardant decreases the melt flow (CEx4), due to its higher $M_W$ (about 24,000 g/mole compared with 21,000 g/mole).

The Examples demonstrate the ability of an aromatic organophosphorus compound such as BPADP, present at the amounts shown, to achieve a unique balance of low smoke and low heat release, as measured according to European Railway standard EN-45545 testing, in combination with high flow rate (MVR) and high practical multiaxial impact (MAI) at room temperature, which could not be achieved for compositions without the addition of an aromatic organophosphorus compound such as BPADP. Furthermore, these results are not observed in alternative smoke and heat release testing, such as those of Federal Aviation Regulation (FAR) part 25.853.

Examples 5-9

Examples 5-9 demonstrate the effect of the addition of an aromatic organophosphorus compound (BPADP) to ITR-PC copolymer. Formulations and results are shown in Table 5.

TABLE 5

|  | Unit | Ex5 | Ex6 | Ex7 | Ex8 | CEx9 |
|---|---|---|---|---|---|---|
| Component |  |  |  |  |  |  |
| ITR-PC | % | 97.44 | 96.19 | 94.13 | 92.44 | 99.94 |
| PEPQ | % | 0.06 | 0.06 | 0.06 | 0.06 | 0.06 |
| BPADP | % | 2.5 | 3.75 | 5.63 | 7.5 | 0 |
| P-content | % | 0.22 | 0.33 | 0.50 | 0.67 | 0 |
| Property |  |  |  |  |  |  |
| MAI, 4.4 m/s | J | 115 | 103 | 130 | 125 | 119 |
| MVR, 300° C., 1.2 kg | cc/10' | 10.2 | 18.8 | 18.2 | 21.4 | 9.5 |
| Ds-4 ISO 5659-2 | — | 179 | 183 | 183 | 154 | 186 |
| MAHRE ISO5660-1 (kW/m$^2$) | — | 114 | 86 | 88 | 78 | 125 |

The results shown in Table 5 demonstrate that in the absence of an aromatic organophosphorus compound (BPADP), ITR-PC siloxane copolymer (CEx 9) has a smoke density (Ds-4 of 186) at 3 mm thickness that meets the requirements for HL-2 in the European Railway standard EN-45545 (Ds-4 value ≤300). However, the heat release (MAHRE of 125 kW/m$^2$) at 3 mm thickness does not meet the requirements for HL-2 in the European Railway standard EN-45545 (MAHRE at or below 90 kW/m$^2$ at 3 mm thickness).

As shown in Table 5 and illustrated in FIG. 1, the addition of an aromatic organophosphorus compound (BPADP in these examples) to ITR-PC (Ex5, Ex6, Ex7, Ex8) yields slightly improved or comparable Ds-4 values in the ISO 5659-2 smoke density test compared to the Comparative Example without the aromatic organophosphorus compound (CEx9). The aromatic organophosphorus compound therefore does not have a negative impact on the smoke density when measured according to ISO 5659-2.

In addition, as shown in Table 5 and FIG. 2, the aromatic organophosphorus compound (BPADP) has a positive effect on the heat release (MAHRE), reducing it from a value of 125 kW/m$^2$ for ITR-PC without an aromatic organophosphorus compound (CEx9), down to MAHRE values below 90 kW/m$^2$ (Ex6, Ex7, Ex8) at 3 mm thickness.

Figure 2:
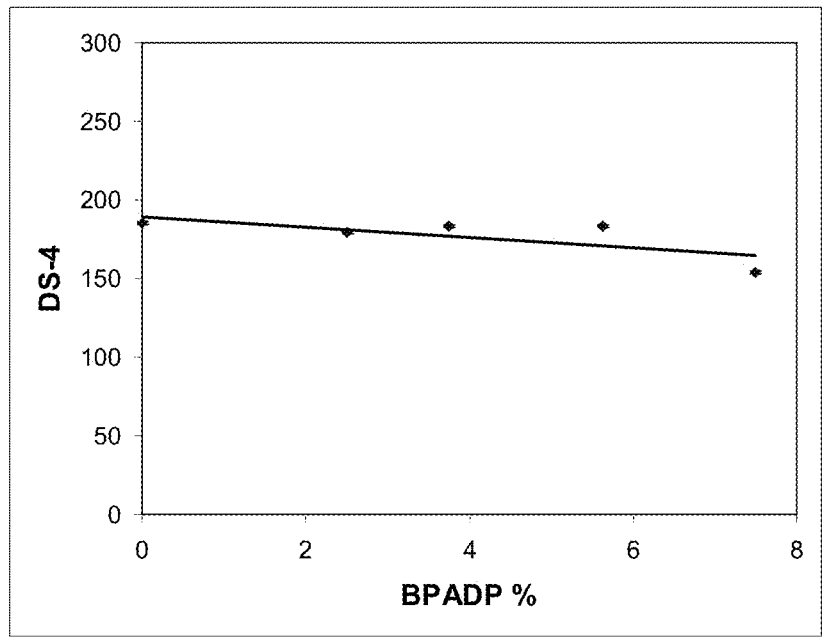
FIG. 2 shows the effect of increasing BPADP concentration in an ITR-PC copolymer on smoke density (Ds-4).

As shown in Examples 5-8 and illustrated graphically in FIGS. 1 and 2, the relative amount of the aromatic organophosphorus compounds (e.g., BPADP) has no significant effect on Ds-4. In contrast, the addition of larger amounts of an aromatic organophosphorus compound such as BPADP to an ITR-PC copolymer results in a continuous decrease in heat release rate, decreasing the MAHRE from around 125 kW/m$^2$ without BPADP to 78 for 7.5 wt % BPADP (a decrease of 33% in MAHRE) at 3 mm thickness.

An additional advantage of the addition of aromatic organophosphorus compounds, such as BPADP, is that it provides a significant improvement in the melt flow properties compared to the ITR-PC copolymer without an aromatic organophosphorus compound. The improvement in MVR, measured at 300° C. and 1.2 kg according to ISO 1133, is from 9.5 (CEx9) to 18.2 up to 21.4 (Ex 6, 7 and 8) without compromising high multiaxial impact (MAI) at room temperature, as shown in Table 5.

The reduction in MAHRE values combined with the low smoke density makes these materials suitable for Hazard Level 2 (HL-2) (Ds-4≤300 and MAHRE≤90 kW/m$^2$) or potentially even HL-3 (Ds-4≤150 and MAHRE≤60 kW/m$^2$) in European Railway standard EN-45545 class R6 applications, whereas ITR-PC copolymer without an aromatic organophosphorus compound does not comply (CEx9) with these new standards.

Examples 10-16

Examples 10-16 demonstrate the effect of the addition of alternative phosphorus compounds, effective to provide a given amount of phosphorus to the composition, to ITR-PC copolymers, as well as the addition of alternative flame retardant agents to compositions of ITR-PC copolymer containing aromatic organophosphorus compounds (BPADP, RDP and TP100 in these examples). Formulations and results are shown in Table 6.

The results shown in Table 6 demonstrate that at similar percent phosphorus (% P of 0.65 to 0.67), alternative aromatic organophosphorus compounds, namely TP100 (Ex10) and RDP (Ex11) perform similarly to BPADP (Ex12). The Ds-4 either remains similar or decreases compared to the Comparative Example (CEx16) without the aromatic organophosphorus compound. The aromatic organophosphorus compounds therefore do not have a negative impact or even a positive effect on Ds-4 when measured according to ISO 5659-2 on 3 mm thick plaques.

In addition, as shown Table 6, the aromatic organophosphorus compounds, namely TP100 (Ex10), RDP (Ex11) and BPADP (Ex12) all have similar positive effects on the heat release (MAHRE), reducing it from 135 kW/m$^2$ for ITR-PC copolymer without an aromatic organophosphorus compound (CEx16) to MAHRE values below 90 kW/m$^2$ (respectively 89, 85 and 89 kW/m$^2$ for TP100, RDP and BPADP), all measured on 3 mm thick plaques. The reduction in MAHRE values makes these materials suitable for Hazard Level 2 (HL-2) (Ds-4≤300 and MAHRE≤90 kW/m$^2$) in European Railway standard EN-45545 class R6 applications, whereas ITR-PC copolymer without an aromatic organophosphorus compound does not comply (CEx16).

In contrast, the positive effect on heat release (MAHRE) is not observed for a non-aromatic organophosphorus compound, namely boron phosphate (CEx15). Addition of this compound to ITR-PC copolymer results in a negative effect on heat release, as an increase from 135 to 159 kW/m$^2$ in MAHRE is observed, all measured at 3 mm thickness.

The positive effect of BPADP in ITR-PC copolymer on the heat release properties is observed irrespective of whether a heat stabilizer (PEPQ) is (Ex12), or is not added (Ex13) to the composition.

The reduction in MAHRE values combined with the low smoke density makes compositions with ITR-PC copolymer and aromatic organophosphorus compounds suitable for Hazard Level 2 (HL-2) (Ds-4≤300 and MAHRE≤90 kW/m$^2$) in European Railway standard EN-45545 class R6 applications, whereas ITR-PC copolymer without an aromatic organophosphorus compound does not comply (CEx16).

Examples 17-22

Examples 17-22 show the effect of adding an aromatic organophosphorus compound (BPADP) to other copolymers, namely ITR-PC-Si and PC-Ester, as well as a polycarbonate homopolymer. Formulations and results are shown in Table 7.

TABLE 6

|  | Unit | Ex10 | Ex11 | Ex12 | Ex13 | CEx15 | CEx16 |
| --- | --- | --- | --- | --- | --- | --- | --- |
| Component |  |  |  |  |  |  |  |
| ITR-PC | % | 92.07 | 93.73 | 92.44 | 92.5 | 97.65 | 99.94 |
| PEPQ | % | 0.06 | 0.06 | 0.06 | 0 | 0.06 | 0.06 |
| BPADP | % | 0 | 0 | 7.5 | 7.5 | 0 | 0 |
| RDP | % | 0 | 6.21 | 0 | 0 | 0 | 0 |
| TP100 | % | 6.87 | 0 | 0 | 0 | 0 | 0 |
| Boron monophosphate | % | 0 | 0 | 0 | 0 | 2.29 | 0 |
| P-content | % | 0.65 | 0.67 | 0.67 | 0.67 | 0.65 | 0 |
| Property |  |  |  |  |  |  |  |
| Ds-4 ISO 5659-2 | — | 149 | 175 | 142 | 124 | 142 | 186 |
| MAHRE ISO5660-1 | — | 89 | 85 | 89 | 80 | 159 | 135 |

TABLE 7

| Components, wt % | Ex17 | CEx18 | Ex19 | CEx20 | CEx21 | CEx22 |
|---|---|---|---|---|---|---|
| ITR-PC-Si | 90.34 | 97.84 | 0 | 0 | 0 | 0 |
| PC-Ester | 0 | 0 | 92.5 | 100 | 0 | 0 |
| PC | 0 | 0 | 0 | 0 | 92.5 | 100 |
| PEPQ | 0.06 | 0.06 | 0 | 0 | 0 | 0 |
| Coated TiO$_2$ | 2.00 | 2.00 | 0 | 0 | 0 | 0 |
| Carbon black | 0.10 | 0.10 | 0 | 0 | 0 | 0 |
| BPADP | 7.5 | 0 | 7.5 | 0 | 7.5 | 0 |
| Property | | | | | | |
| Ds-4 ISO 5659-2 | 127 | 104 | 340 | 1140 | 1320 | 900 |
| MAHRE ISO 5660-1 | 56 | 113 | 120 | 217 | 211 | 236 |

As shown in Table 7, the addition of an aromatic organophosphorus compound (BPADP in these examples) to the ITR-PC-siloxane copolymer (Ex17) yields slightly increased Ds-4 values (127 compared to 104 in CEx18) in the ISO smoke density test and a significant reduction in the MAHRE values (56 kW/m$^2$ compared to 113 kW/m$^2$) in the ISO heat release test compared to the composition without the aromatic organophosphorus compound (CEx18), all measured at 3 mm thickness.

The reduction in MAHRE values makes these materials suitable for Hazard Level 2 (HL-2) (Ds-4≤300 and MAHRE≤90 kW/m$^2$) or potentially even HL-3 (Ds-4≤150 and MAHRE≤60 kW/m$^2$) in European Railway standard EN-45545 class R6 applications, whereas the ITR-PC-siloxane copolymers without an aromatic organophosphorus compound (CEx18) does not comply with HL-2 of European Railway standard EN-45545 standard.

Table 7 also shows that the addition of an aromatic organophosphorus compound (BPADP in these examples) to PC-ester copolymer (Ex19) significantly decreases both Ds-4 values (340 compared to 1140) in the ISO smoke density test and the MAHRE values (120 kW/m$^2$ compared to 217 kW/m$^2$) in the ISO heat release test compared to the composition without the aromatic organophosphorus compound (CEx20), all measured on 3 mm thick plaques. This demonstrates that the effect of the aromatic organophosphorus compound (BPADP) also translates to other poly(carbonate-arylate ester)s.

Table 7 also shows that addition of BPADP to a polycarbonate homopolymer (PC) (CEx21 vs. CEx22) has a negative effect on the Ds-4 smoke density measured according to ISO 5659-2 and a neutral effect on the heat release (MAHRE) measured according to ISO 5660-1, all measured on a 3 mm thick plaque. Combined with the results shown in Tables 4-6, these results indicate that the positive effect of adding an organophosphorus compound to poly(carbonate-arylate ester)s does not occur with all polycarbonates, and instead is copolymer specific.

Examples 23-27

Examples 23-27 show the effect of adding an aromatic organophosphorus compound (BPADP) to ITR-PC-Si in various quantities on the heat release. Formulations and results are shown in Table 8.

TABLE 8

| Components, wt % | Ex23 | Ex24 | Ex25 | Ex26 | Ex27 |
|---|---|---|---|---|---|
| ITR-PC-Si | 91.34 | 90.34 | 89.34 | 88.34 | 87.34 |
| PC-Ester | | | | | |
| PC | | | | | |
| PEPQ | 0.06 | 0.06 | 0.06 | 0.06 | 0.06 |
| Coated TiO$_2$ | 2.00 | 2.00 | 2.00 | 2.00 | 2.00 |
| Carbon black | 0.10 | 0.10 | 0.10 | 0.10 | 0.10 |
| BPADP | 6.50 | 7.50 | 8.50 | 9.50 | 10.50 |
| Property | | | | | | 
| MAHRE ISO 5660-1 | 45 | 46 | 42 | 45 | 47 |

As shown in Table 8, the addition of an aromatic organophosphorus compound (BPADP in these examples) to the ITR-PC-siloxane copolymer (Ex23-27) in various quantities ranging from 6.5% (Example 23) to 10.5% (Example 27) yields low MAHRE values (all below 50 kW/m2), significantly below the threshold for HL3 compliance for R6 applications (MAHRE<60).

This shows that sufficiently low MAHRE values can be achieved upon addition of BPADP to ITR-PC-siloxane copolymer to make these materials suitable for Hazard Level 2 (HL-2) (Ds-4≤300 and MAHRE≤90 kW/m$^2$) or potentially even HL-3 (Ds-4≤150 and MAHRE≤60 kW/m$^2$) in European Railway standard EN-45545 class R6 applications, using a broad range of BPADP levels, which allows tuning of other properties, such as flow and/or impact.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refer broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising, based on the total weight of the composition,
    88 to 98 wt % of a poly(carbonate-arylate ester), wherein the poly(carbonate-arylate ester) is a poly(carbonate-monoaryl arylate ester), a poly(carbonate-monoaryl arylate ester) comprising siloxane units, or a combination comprising at least one of the foregoing; and
    2 to 12 wt % of bisphenol A bis(diphenyl phosphate);
    optionally, up to 5 wt % of an additive selected from a processing aid, a heat stabilizer, an ultra violet light absorber, a colorant, or a combination comprising at least one of the foregoing, wherein an article molded from the composition has
    a maximum average heat release (MAHRE) of less than or equal to 90 kW/m$^2$ determined according to ISO 5660-1 on a 3 mm thick plaque, and
    a smoke density after 4 minutes (Ds-4) of less than or equal to 300 determined according to ISO 5659-2 on a 3 mm thick plaque,
wherein the poly(carbonate-monoaryl arylate ester) comprises
    repeating carbonate units of the formula

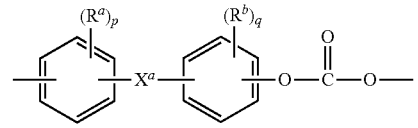

wherein
    $R^a$ and $R^b$ are each independently are each independently $C_{1-12}$ alkyl,
    p and q are each independently integers of 0 to 4, and
    $X^a$ is a single bond, —O—, —S—, —S(O)—, —S(O)$_2$—, —C(O)—, or a $C_{1-18}$ organic group; and
    monoarylate ester units of the formula

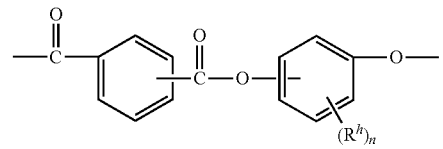

wherein
    $R^h$ is each independently a halogen or $C_{1-10}$ hydrocarbon group, and
    n is 0 to 4; and
wherein the poly(carbonate-monoaryl arylate ester) comprising siloxane units comprises
    repeating carbonate units of the formula

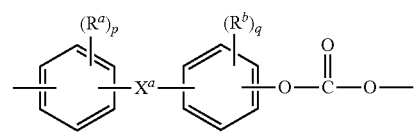

wherein
    $R^a$ and $R^b$ are each independently are each independently $C_{1-12}$ alkyl,
    p and q are each independently integers of 0 to 4, and
    $X^a$ is a single bond, —O—, —S—, —S(O)—, —S(O)$_2$—, —C(O)—, or a $C_{1-18}$ organic group; and arylate ester units of the formula

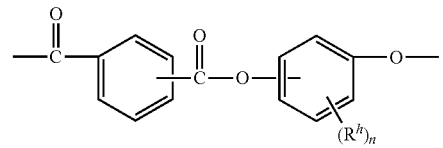

wherein
- $R^h$ is each independently a halogen or $C_{1-10}$ hydrocarbon group, and
- n is 0 to 4; and siloxane units of the formula

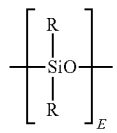

wherein
- each R is independently a $C_{1-13}$ monovalent hydrocarbon group, and
- E has an average value of 2 to 500; and
- wherein poly(carbonate-arylate ester) is a combination of a poly(bisphenol-A carbonate)-co-poly(isophthalate-terephthalate-resorcinol ester) and a poly(bisphenol-A carbonate)-co-poly(isophthalate-terephthalate-resorcinol ester)-co-poly(siloxane) comprising, a based on the total weight of the poly(carbonate-arylate ester)s,
- 20 to 80 wt % of the poly(bisphenol-A carbonate)-co-poly(isophthalate-terephthalate-resorcinol ester); and
- 20 to 80 wt % of the poly(bisphenol-A carbonate)-co-poly(isophthalate-terephthalate-resorcinol ester)-co-poly(siloxane) which comprises siloxane units of the formula

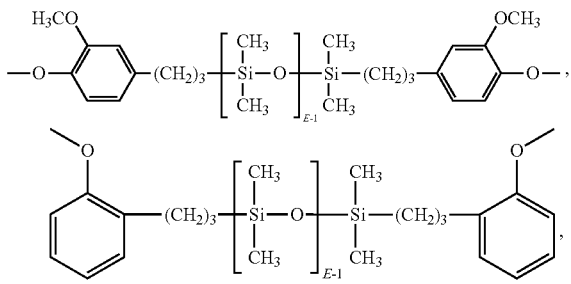

or a combination thereof, wherein E has an average value of 5 to 60, and the siloxane units are present in an amount effective to provide 0.1 to 10 wt % of siloxane units, based on the weight of the poly(bisphenol-A carbonate)-co-poly(isophthalate-terephthalate-resorcinol ester)-co-poly(siloxane).

2. The composition of claim 1, wherein the siloxane units are present in an amount effective to provide 0.5% to 7% siloxane units based on the weight of the composition.

3. A train or aircraft interior component comprising the composition of claim 1.

4. The composition of claim 1, wherein the bisphenol A bis(diphenyl phosphate) is effective to provide phosphorus in an amount of 0.3% to 0.8%, based on the weight of the composition.

5. The composition of claim 1, having a transparency of more than 85% and a haze of less than 3%, each measured according to ASTM D 1003 (2007) using illuminant C on plaques with 3 mm thickness.

6. The composition of claim 1, wherein no or substantially no flame retarding brominated compounds, flame retardant salts, or a combination comprising at least one of the foregoing are present in the composition.

7. The composition of claim 6, wherein the brominated compound is a brominated polycarbonate, and the flame retardant salt is potassium perfluorobutane sulfonate, potassium perfluorooctane sulfonate, tetraethylammonium perfluorohexane sulfonate, potassium diphenylsulfone sulfonate, $Na_2CO_3$, $K_2CO_3$, $MgCO_3$, $CaCO_3$, and $BaCO_3$, an inorganic phosphate salt, $Li_3AlF_6$, $BaSiF_6$, $KBF_4$, $K_3AlF_6$, $KAlF_4$, $K_2SiF_6$, $Na_3AlF_6$, or a combination comprising at least one of the foregoing.

8. The composition of claim 6, wherein no or substantially no brominated polycarbonate, boron phosphate, or $C_{1-6}$ alkyl sulfonate salt is present in the composition.

9. An article comprising the composition of claim 1, selected from a molded article, a thermoformed article, an extruded film, an extruded sheet, a foamed article, a layer of a multi-layer article, a substrate for a coated article, or a substrate for a metallized article.

10. The article of claim 9, having a thickness of 0.1 to 10 mm.

11. The article of claim 9, having a thickness of 0.5 to 5 mm.

12. The article of claim 9, wherein the article is a transportation component.

13. The article of claim 12, wherein the component is a partition, a room divider, a seat back, a food tray, a trim panel, an interior display panel, an interior wall, a side wall, an end wall, a ceiling panel, a door lining, a flap, a box, a hood, a louver, an insulation material, a handle, a body shell for a window, a window frame, an enclosure for an electronic device, a door, a luggage rack, a luggage container, an interior side of a gangway membrane, an interior lining of a gangway, or a component of a luggage compartment, a display unit, a television, a refrigerator door, a tray table, a food cart, a magazine rack, an air flow regulator, a door, a table, or a seat.

14. A method of manufacture of an article, comprising molding, extruding, foaming, or casting the composition of claim 1.

15. A thermoplastic composition comprising, based on the total weight of the composition,
- 88 to 98 wt % of a poly(carbonate-arylate ester), wherein the poly(carbonate-arylate ester) is a poly(carbonate-monoaryl arylate ester), a poly(carbonate-monoaryl arylate ester) comprising siloxane units, or a combination comprising at least one of the foregoing; and
- 2 to 12 wt % of bisphenol A bis(diphenyl phosphate);
- optionally, up to 5 wt % of an additive selected from a processing aid, a heat stabilizer, an ultra violet light absorber, a colorant, or a combination comprising at least one of the foregoing,
- wherein an article molded from the composition has
  - a maximum average heat release (MAHRE) of less than or equal to 90 $kW/m^2$ determined according to ISO 5660-1 on a 3 mm thick plaque, and
  - a smoke density after 4 minutes (Ds-4) of less than or equal to 300 determined according to ISO 5659-2 on a 3 mm thick plaque, wherein the poly(carbonate-monoaryl arylate ester) comprises repeating carbonate units of the formula

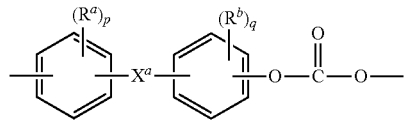

wherein
$R^a$ and $R^b$ are each independently are each independently $C_{1-12}$ alkyl,
p and q are each independently integers of 0 to 4, and
$X^a$ is a single bond, —O—, —S—, —S(O)—, —S(O)$_2$—, —C(O)—, or a $C_{1-18}$ organic group; and monoarylate ester units of the formula

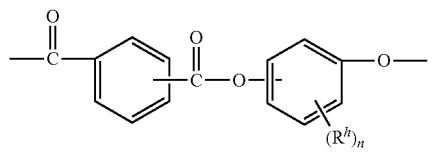

wherein
$R^h$ is each independently a halogen or $C_{1-10}$ hydrocarbon group, and
n is 0 to 4; and wherein the poly(carbonate-monoaryl arylate ester) comprising siloxane units comprises repeating carbonate units of the formula

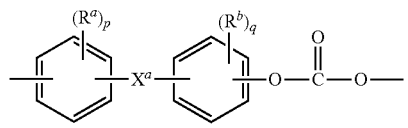

wherein
$R^a$ and $R^b$ are each independently are each independently $C_{1-12}$ alkyl,
p and q are each independently integers of 0 to 4, and
$X^a$ is a single bond, —O—, —S—, —S(O)—, —S(O)$_2$—, —C(O)—, or a $C_{1-18}$ organic group; and arylate ester units of the formula

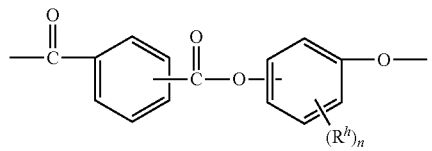

wherein
$R^h$ is each independently a halogen or $C_{1-10}$ hydrocarbon group, and
n is 0 to 4; and siloxane units of the formula

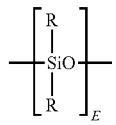

wherein
each R is independently a $C_{1-13}$ monovalent hydrocarbon group, and
E has an average value of 2 to 500; and
wherein the poly(carbonate-arylate ester) is a poly(bisphenol-A carbonate)-co-poly(isophthalate-terephthalate-resorcinol ester).

16. A train or aircraft interior component comprising the composition of claim 15.

17. The composition of claim 15, wherein the bisphenol A bis(diphenyl phosphate) is effective to provide phosphorus in an amount of 0.3% to 0.8%, based on the weight of the composition.

18. The composition of claim 15, having a transparency of more than 85% and a haze of less than 3%, each measured according to ASTM D 1003 (2007) using illuminant C on plaques with 3 mm thickness.

19. The composition of claim 15, wherein no or substantially no flame retarding brominated compounds, flame retardant salts, or a combination comprising at least one of the foregoing are present in the composition.

20. The composition of claim 19, wherein the brominated compound is a brominated polycarbonate, and the flame retardant salt is potassium perfluorobutane sulfonate, potassium perfluorooctane sulfonate, tetraethylammonium perfluorohexane sulfonate, potassium diphenylsulfone sulfonate, $Na_2CO_3$, $K_2CO_3$, $MgCO_3$, $CaCO_3$, and $BaCO_3$, an inorganic phosphate salt, $Li_3AlF_6$, $BaSiF_6$, $KBF_4$, $K_3AlF_6$, $KAlF_4$, $K_2SiF_6$, $Na_3AlF_6$, or a combination comprising at least one of the foregoing.

21. The composition of claim 19, wherein no or substantially no brominated polycarbonate, boron phosphate, or $C_{1-6}$ alkyl sulfonate salt is present in the composition.

22. An article comprising the composition of claim 15, selected from a molded article, a thermoformed article, an extruded film, an extruded sheet, a foamed article, a layer of a multi-layer article, a substrate for a coated article, or a substrate for a metallized article.

23. The article of claim 22, having a thickness of 0.1 to 10 mm.

24. The article of claim 22, having a thickness of 0.5 to 5 mm.

25. The article of claim 22, wherein the article is a transportation component.

26. The article of claim 25, wherein the component is a partition, a room divider, a seat back, a food tray, a trim panel, an interior display panel, an interior wall, a side wall, an end wall, a ceiling panel, a door lining, a flap, a box, a hood, a louver, an insulation material, a handle, a body shell for a window, a window frame, an enclosure for an electronic device, a door, a luggage rack, a luggage container, an interior side of a gangway membrane, an interior lining of a gangway, or a component of a luggage compartment, a display unit, a television, a refrigerator door, a tray table, a food cart, a magazine rack, an air flow regulator, a door, a table, or a seat.

27. A method of manufacture of an article, comprising molding, extruding, foaming, or casting the composition of claim 15.

28. A thermoplastic composition comprising, based on the total weight of the composition, 88 to 98 wt % of a poly(carbonate-arylate ester), wherein the poly(carbonate-arylate ester) is a poly(carbonate-monoaryl arylate ester), a poly(carbonate-monoaryl arylate ester) comprising siloxane units, or a combination comprising at least one of the foregoing; and 2 to 12 wt % of bisphenol A bis(diphenyl phosphate);

optionally, up to 5 wt % of an additive selected from a processing aid, a heat stabilizer, an ultra violet light absorber, a colorant, or a combination comprising at least one of the foregoing, wherein an article molded from the composition has a maximum average heat release (MAHRE) of less than or equal to 90 kW/m² determined according to ISO 5660-1 on a 3 mm thick plaque, and a smoke density after 4 minutes (Ds-4) of less than or equal to 300 determined according to ISO 5659-2 on a 3 mm thick plaque, wherein the poly(carbonate-monoaryl arylate ester) comprises repeating carbonate units of the formula

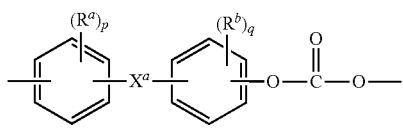

wherein $R^a$ and $R^b$ are each independently are each independently $C_{1-12}$ alkyl, p and q are each independently integers of 0 to 4, and $X^a$ is a single bond, —O—, —S—, —S(O)—, —S(O)$_2$—, —C(O)—, or a $C_{1-18}$ organic group; and monoarylate ester units of the formula

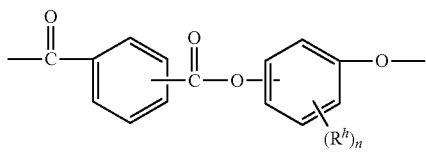

wherein $R^h$ is each independently a halogen or $C_{1-10}$ hydrocarbon group, and n is 0 to 4; and wherein the poly(carbonate-monoaryl arylate ester) comprising siloxane units comprises repeating carbonate units of the formula

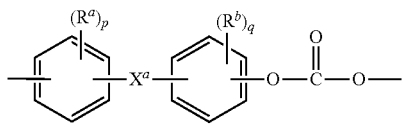

wherein $R^a$ and $R^b$ are each independently are each independently $C_{1-12}$ alkyl, p and q are each independently integers of 0 to 4, and $X^a$ is a single bond, —O—, —S—, —S(O)—, —S(O)$_2$—, —C(O)—, or a $C_{1-18}$ organic group; and arylate ester units of the formula

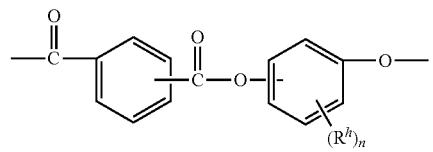

wherein $R^h$ is each independently a halogen or $C_{1-10}$ hydrocarbon group, and n is 0 to 4; and siloxane units of the formula

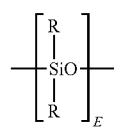

wherein each R is independently a $C_{1-13}$ monovalent hydrocarbon group, and

E has an average value of 2 to 500; and wherein the poly(carbonate-arylate ester) is a poly(bisphenol-A carbonate)-co-poly(isophthalate-terephthalate-resorcinol ester)-co-poly(siloxane).

29. The composition of claim 28, wherein the siloxane units are present in an amount effective to provide 0.5% to 7% siloxane units based on the weight of the composition.

30. A train or aircraft interior component comprising the composition of claim 28.

31. The composition of claim 28, wherein the bisphenol A bis(diphenyl phosphate) is effective to provide phosphorus in an amount of 0.3% to 0.8%, based on the weight of the composition.

32. The composition of claim 28, having a transparency of more than 85% and a haze of less than 3%, each measured according to ASTM D 1003 (2007) using illuminant C on plaques with 3 mm thickness.

33. The composition of claim 28, wherein no or substantially no flame retarding brominated compounds, flame retardant salts, or a combination comprising at least one of the foregoing are present in the composition.

34. The composition of claim 33, wherein the brominated compound is a brominated polycarbonate, and the flame retardant salt is potassium perfluorobutane sulfonate, potassium perfluorooctane sulfonate, tetraethylammonium perfluorohexane sulfonate, potassium diphenylsulfone sulfonate, Na$_2$CO$_3$, K$_2$CO$_3$, MgCO$_3$, CaCO$_3$, and BaCO$_3$, an inorganic phosphate salt, Li$_3$AlF$_6$, BaSiF$_6$, KBF$_4$, K$_3$AlF$_6$, KAlF$_4$, K$_2$SiF$_6$, Na$_3$AlF$_6$, or a combination comprising at least one of the foregoing.

35. The composition of claim 33, wherein no or substantially no brominated polycarbonate, boron phosphate, or $C_{1-6}$ alkyl sulfonate salt is present in the composition.

36. An article comprising the composition of claim 28, selected from a molded article, a thermoformed article, an extruded film, an extruded sheet, a foamed article, a layer of a multi-layer article, a substrate for a coated article, or a substrate for a metallized article.

37. The article of claim 36, having a thickness of 0.1 to 10 mm.

38. The article of claim 36, having a thickness of 0.5 to 5 mm.

39. The article of claim 36, wherein the article is a transportation component.

40. The article of claim 39, wherein the component is a partition, a room divider, a seat back, a food tray, a trim panel, an interior display panel, an interior wall, a side wall, an end wall, a ceiling panel, a door lining, a flap, a box, a hood, a louver, an insulation material, a handle, a body shell for a window, a window frame, an enclosure for an electronic device, a door, a luggage rack, a luggage container, an interior side of a gangway membrane, an interior lining of a gangway, or a component of a luggage compartment, a display unit, a television, a refrigerator door, a tray table, a food cart, a magazine rack, an air flow regulator, a door, a table, or a seat.

41. A method of manufacture of an article, comprising molding, extruding, foaming, or casting the composition of claim 28.

* * * * *